(12) United States Patent
Bhardwaj et al.

(10) Patent No.: US 12,634,322 B1
(45) Date of Patent: May 19, 2026

(54) REAL-TIME MULTI-MODAL AUDIO ANOMALY DETECTION SYSTEM

(71) Applicant: Elevance Systems, Cupertino, CA (US)

(72) Inventors: Arth Bhardwaj, Cupertino, CA (US); Bharani Krish, Cypress, CA (US)

(73) Assignee: Elevance Systems, Cupertino, CA (US)

( * ) Notice: Subject to any disclaimer, the term of this patent is extended or adjusted under 35 U.S.C. 154(b) by 0 days.

(21) Appl. No.: 19/406,907

(22) Filed: Dec. 2, 2025

(51) Int. Cl.
| | |
|---|---|
| *G10L 15/02* | (2006.01) |
| *G10L 15/18* | (2013.01) |
| *G10L 25/18* | (2013.01) |
| *G10L 25/21* | (2013.01) |
| *G10L 25/60* | (2013.01) |
| *G10L 25/90* | (2013.01) |
| *H04L 9/40* | (2022.01) |
| *H04L 65/1069* | (2022.01) |

(52) U.S. Cl.
CPC .......... *H04L 63/1425* (2013.01); *G10L 15/02* (2013.01); *G10L 15/1815* (2013.01); *G10L 25/18* (2013.01); *G10L 25/21* (2013.01); *G10L 25/60* (2013.01); *G10L 25/90* (2013.01); *H04L 63/123* (2013.01); *H04L 65/1069* (2013.01)

(58) Field of Classification Search
CPC .............. H04L 63/1425; H04L 63/123; H04L 65/1069; G10L 15/02; G10L 15/1815; G10L 25/18; G10L 25/21; G10L 25/60; G10L 25/90

USPC .......................................................... 704/205
See application file for complete search history.

(56) References Cited

U.S. PATENT DOCUMENTS

2025/0358316 A1* 11/2025 Wen ..................... H04L 63/1425

* cited by examiner

*Primary Examiner* — Thierry L Pham
(74) *Attorney, Agent, or Firm* — Outlier Patent Attorneys, PLLC

(57) ABSTRACT

A real-time voice fraud detection system for telecommunications comprises three parallel analysis modules operating simultaneously on incoming call audio. A speech recognition module analyzes linguistic content and conversational patterns to generate a first risk score. An acoustic analysis module examines audio waveform characteristics to detect synthetic or artificially generated voices, producing a second risk score. A metadata analysis module evaluates call origination data and network information to generate a third risk score. A decision engine integrates the three risk scores using a hybrid approach combining artificial intelligence algorithms and configurable rule-based logic to determine call legitimacy. The system features adaptive learning capabilities that enable automatic updates to detection parameters based on newly identified fraud patterns without requiring complete model retraining. This architecture provides robust, real-time protection against evolving voice-based fraud schemes including deepfake audio, voice synthesis attacks, and caller ID spoofing while maintaining low latency suitable for live call processing.

8 Claims, 8 Drawing Sheets

Initialize Audio Stream Capture 302

Execute Parallel Feature Extraction 304

Generate Normalized Risk Vectors 306

Apply Hybrid Inference Logic 308

Perform Drift Detection Analysis 310

Execute Incremental Model Update 312

Trigger Security Response Protocol 314

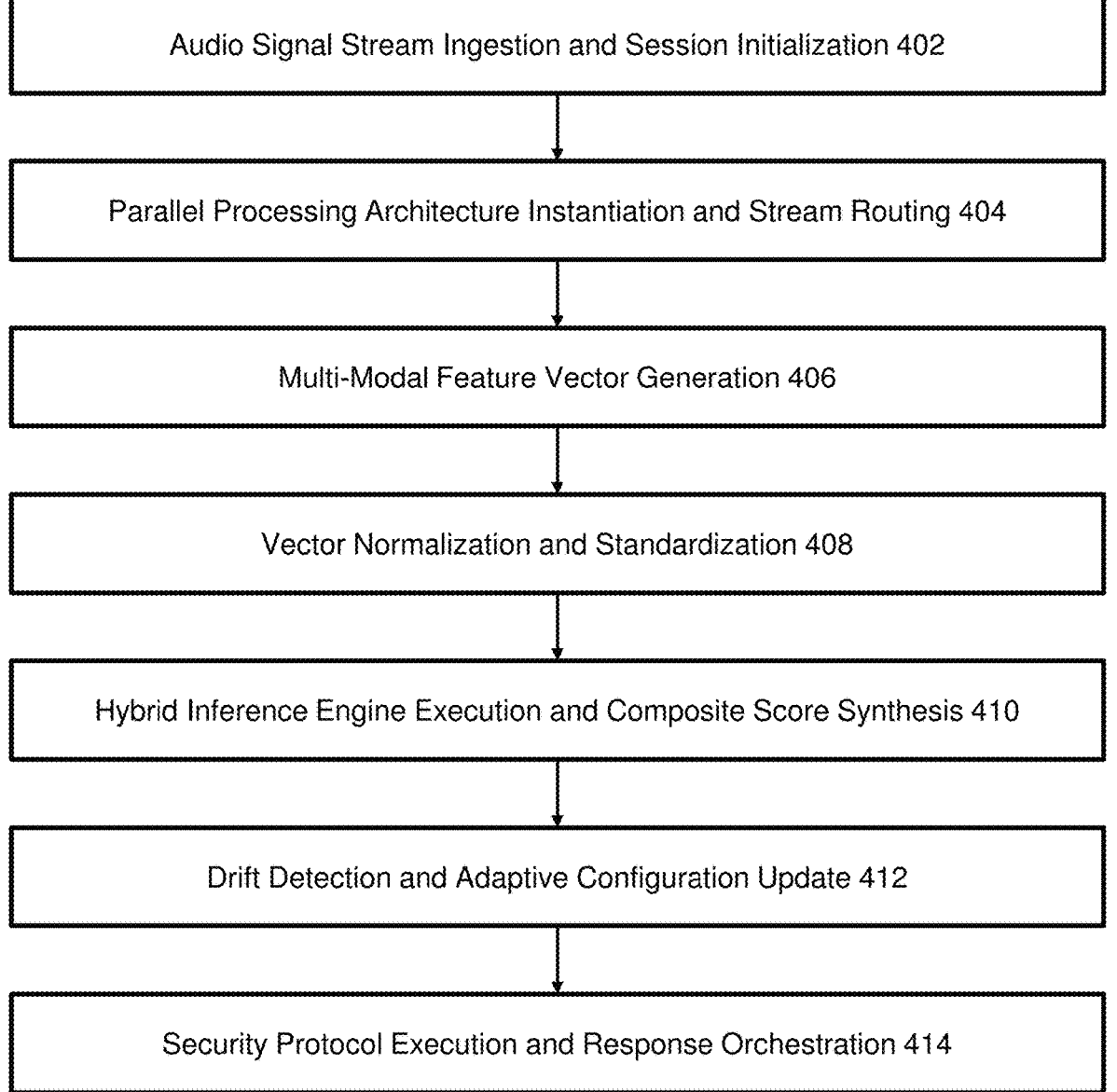

Audio Signal Stream Ingestion and Session Initialization 402

Parallel Processing Architecture Instantiation and Stream Routing 404

Multi-Modal Feature Vector Generation 406

Vector Normalization and Standardization 408

Hybrid Inference Engine Execution and Composite Score Synthesis 410

Drift Detection and Adaptive Configuration Update 412

Security Protocol Execution and Response Orchestration 414

24 — Clients

23 — Services

22 — OSes

21 — Processors

Input — 28

Outputs — 27

Storage — 26

Memory — 25

20

30

40

REAL-TIME MULTI-MODAL AUDIO ANOMALY DETECTION SYSTEM

CROSS-REFERENCE TO RELATED APPLICATIONS

None.

BACKGROUND

Field of the Art

The present disclosure relates generally to telecommunications security. More particularly, the disclosure relates to systems and methods for verifying the authenticity of audio data in communication environments.

Discussion of the State of the Art

Voice-based communication is a primary channel for interaction, authentication, and sensitive data exchange across various remote computing environments. As reliance on voice-enabled interfaces has increased, so too has the volume of sensitive information transmitted through these channels. Consequently, ensuring the integrity and authenticity of voice interactions has become a priority for secure telecommunications.

Concurrently, advancements in digital signal processing and artificial intelligence have led to the development of sophisticated audio generation technologies. Architectures capable of text-to-speech synthesis, voice conversion, and voice cloning can now produce audio content with high fidelity. These generative technologies are designed to approximate the spectral and prosodic characteristics of natural human speech.

As these technologies mature, the acoustic distinction between authentic human speech and computer-generated audio diminishes. Synthetic audio can now mimic the vocal characteristics of specific target speakers with a degree of accuracy that can be difficult to distinguish from organic speech. Furthermore, the accessibility of these tools allows for the rapid generation of synthetic content at scale.

In the context of telecommunications, analyzing audio streams to verify authenticity involves processing complex signals in dynamic environments. The signals may be subject to varying network conditions, compression codecs, and background noise, all of which add complexity to the task of signal verification. Given the evolving capabilities of generative audio technologies, the problem is becoming worse and more intractable.

SUMMARY

In accordance with aspects of the present disclosure, a system for real-time anomaly detection in audio signal streams addresses the foregoing limitations through a novel multi-modal, parallel-processing architecture integrated with an adaptive hybrid inference engine.

In one aspect, the system ingests a real-time audio signal stream associated with a communication session and simultaneously routes the audio signal stream, via a parallel processing architecture, to a plurality of independent analysis modules. The parallel routing enables concurrent extraction of heterogeneous feature representations from a single audio source, eliminating the latency penalties associated with sequential processing and enabling real-time synthesis of multi-modal intelligence.

In an embodiment, the plurality of analysis modules comprises a semantic analysis module, an acoustic feature module, and a contextual metadata module, each configured to generate a vector representation encoding features relevant to anomaly detection within its respective domain.

The semantic analysis module converts the audio signal stream into text using automatic speech recognition and identifies semantic patterns indicative of anomalous content. Such patterns may include, without limitation, urgency indicators, authority impersonation phrases, requests for sensitive information, or linguistic structures associated with social engineering attacks. The semantic analysis module outputs a content vector encoding the identified semantic features.

The acoustic feature module operates independently of the semantic analysis module and performs spectral analysis on the raw audio signal stream to identify non-semantic synthetic voice artifacts. Unlike speech-to-text systems that discard acoustic detail in favor of linguistic content, the acoustic feature module specifically analyzes characteristics that distinguish natural human speech from synthetic or manipulated audio. In embodiments, the acoustic feature module identifies synthetic voice artifacts comprising frequency discontinuities, pitch modulation inconsistencies, and spectral envelope anomalies. The acoustic feature module may extract Mel-frequency cepstral coefficients (MFCCs) and compare extracted coefficients against a stored voiceprint associated with an expected speaker. Additional acoustic features analyzed may include jitter measurements, shimmer measurements, harmonic-to-noise ratio, formant trajectory characteristics, and compression artifacts indicative of audio manipulation or artificial generation. The acoustic feature module outputs a signal artifact vector encoding the identified acoustic features.

The contextual metadata module generates a behavior vector based on transmission metadata associated with the communication session. In embodiments, the transmission metadata comprises at least two of: originating network geolocation data, a device fingerprint, session timing characteristics relative to historical account activity, or a carrier type classification. The contextual metadata module may compare real-time transmission characteristics against a historical behavior profile associated with an account holder, wherein the behavior vector encodes a deviation score representing divergence from expected patterns. The historical behavior profile may comprise a distribution of session initiation times, a set of previously observed originating network geolocations, a baseline session duration range, and velocity metrics indicating frequency of sessions from common network origins within defined time windows.

In accordance with a further aspect of the disclosure, the system synthesizes a composite anomaly score by applying weighted aggregation to the content vector, the signal artifact vector, and the behavior vector. In embodiments, each vector is assigned a dynamic weight based on a confidence value output by its respective module. The dynamic weighting ensures that vectors generated with higher certainty exert greater influence on the composite score, while vectors generated under conditions of uncertainty are appropriately attenuated. In embodiments, the dynamic weight assigned to each vector is inversely proportional to an uncertainty value output by its respective module. Prior to aggregation, the vectors may be normalized to a common scale to ensure commensurability.

The weighted aggregation is processed through a hybrid inference engine comprising two complementary components: a machine learning model and a deterministic rules engine.

The machine learning model is trained on historical session data to output a probabilistic risk score. In embodiments, the machine learning model comprises an ensemble of a gradient boosting classifier and a neural network, wherein the probabilistic risk score is computed as a weighted average of outputs from the constituent models. The ensemble architecture provides robustness against overfitting and improves generalization to novel attack patterns.

The deterministic rules engine is configured to apply expert-defined conditional logic to the vectors to output a deterministic risk score. Critically, the deterministic rules engine compensates for training data imbalance in the machine learning model. Because the machine learning model is necessarily trained on historical data exhibiting severe class imbalance, it may fail to detect novel attack patterns or may exhibit suboptimal sensitivity to rare but high-severity threats. The deterministic rules engine addresses this limitation by encoding expert knowledge of known attack signatures and logical constraints that do not depend on statistical prevalence in training data. In embodiments, the deterministic rules engine comprises a plurality of conditional rules organized into rule categories, wherein each rule category is assigned a category weight that modulates the contribution of rules within that category to the deterministic risk score. Rule categories may include, without limitation, an identity verification category, a behavioral anomaly category, and a network origin category. In an embodiment, the deterministic rules engine applies at least one rule that evaluates a conjunction of conditions across multiple vectors, such as a geolocation mismatch between originating network geolocation data and a registered account address combined with a voice similarity score from the signal artifact vector falling below a defined similarity threshold.

In accordance with a further aspect of the disclosure, the system dynamically updates a configuration of the hybrid inference engine via a feedback loop, thereby addressing the concept drift problem that plagues static detection systems. The feedback loop receives a disposition signal indicating whether a detected anomaly was a confirmed threat or a false positive. Such disposition signals may be generated by a human analyst via an analyst interface following review of a flagged communication session, or may be generated automatically based on downstream verification outcomes.

The feedback loop applies a time-decay function such that recent disposition signals are weighted more heavily than older disposition signals. In embodiments, the time-decay function comprises an exponential decay function with a configurable half-life parameter, such that disposition signals older than the half-life contribute less than half of their original weight to subsequent parameter adjustments. The time-decay weighting ensures that the system adapts to current threat landscapes while gradually discounting patterns that may no longer be representative of active attack methodologies.

Based on an aggregation of weighted disposition signals over a rolling time window, the feedback loop adjusts at least one weighting parameter of the deterministic rules engine. In embodiments, the feedback loop monitors a false positive rate associated with the deterministic rules engine over the rolling time window and automatically adjusts a score threshold of the hybrid inference engine when the false positive rate exceeds a defined tolerance threshold. In further embodiments, the feedback loop clusters detected anomaly signatures based on vector similarity, identifies novel clusters not represented by existing rules, and generates candidate rules for deployment to the deterministic rules engine, thereby enabling automated expansion of detection coverage to address emerging threat patterns.

In accordance with a further aspect of the disclosure, the system executes a security protocol selected from a tiered response matrix based on the composite anomaly score. The tiered response matrix maps defined score ranges to corresponding security actions, enabling graduated intervention proportional to assessed risk. In embodiments, the security actions comprise passive logging for a first score range, real-time session flagging for agent monitoring for a second score range, initiating a step-up authentication challenge within the communication session for a third score range, and terminating the communication session for a fourth score range. The step-up authentication challenge may comprise a liveness verification prompt requiring a real-time spoken response to a dynamically generated question, thereby defeating pre-recorded or non-interactive synthetic audio attacks. In embodiments, the system logs a protocol outcome associated with the executed security action, and the protocol outcome is provided to the feedback loop as an input for refining the tiered response matrix.

In accordance with a further aspect of the disclosure, the parallel processing architecture comprises a message queue that distributes segments of the audio signal stream to the semantic analysis module, the acoustic feature module, and the contextual metadata module as concurrent processing tasks. This architecture enables the system to perform analysis with latency below a defined threshold duration from ingestion of an audio signal segment to generation of the composite anomaly score, enabling intervention during an ongoing communication session rather than merely post-hoc forensic analysis.

A first advantage associated with the systems and processes described herein is the elimination of single-modal blind spots through multi-modal fusion. By simultaneously analyzing semantic content, acoustic characteristics, and contextual metadata, the disclosed system detects attacks that would evade any single-modal detector. A synthetic voice that successfully bypasses voice biometric comparison may nonetheless exhibit spectral artifacts detectable by the acoustic feature module. A social engineering attack using a legitimate caller's own voice may nonetheless exhibit anomalous metadata patterns detectable by the contextual metadata module. The fusion of multiple detection modalities provides defense in depth that no prior single-modal system can achieve.

A second advantage is the architectural separation of acoustic analysis from speech-to-text processing. Prior systems that rely on transcription inherently discard the acoustic features necessary to detect synthetic voice attacks. The disclosed system routes the audio signal stream to a dedicated acoustic feature module that operates independently of the semantic analysis module, thereby preserving and analyzing precisely those audio characteristics that speech-to-text models are designed to ignore. This architectural choice directly addresses the deepfake detection problem that has emerged as a critical vulnerability in voice-based authentication systems.

A third advantage is the hybrid inference architecture that combines machine learning with deterministic rules. Prior machine learning approaches suffer from training data imbalance that limits their effectiveness on rare attack patterns. Prior rule-based approaches suffer from brittleness in the face of novel attacks. The disclosed hybrid architecture leverages the complementary strengths of both approaches: the machine learning model provides generalization capability and pattern recognition across high-dimensional feature spaces, while the deterministic rules engine provides reliable detection of known attack signatures and logical constraints that do not depend on statistical prevalence. The explicit architectural role of the rules engine in compensating for machine learning limitations represents a technical improvement over prior systems that treat rules and models as independent or competing approaches.

A fourth advantage is the adaptive feedback mechanism that addresses concept drift. Prior static detection systems degrade in effectiveness as attack methodologies evolve. The disclosed system continuously updates its detection parameters based on disposition feedback, with time-decay weighting that prioritizes recent threat intelligence. This adaptive capability enables the system to maintain detection effectiveness over time without requiring complete model retraining or manual rule updates.

A fifth advantage is the real-time processing capability enabled by the parallel architecture. Prior sequential systems introduce latency that may exceed acceptable thresholds for real-time intervention. The disclosed parallel routing of audio signal segments to concurrent analysis modules enables composite score generation within latency bounds that permit intervention during an ongoing communication session, transforming the system from a forensic tool to an active defense mechanism.

A sixth advantage is the graduated response capability provided by the tiered response matrix. Prior systems typically provide binary outputs (anomaly detected or not detected) that force a choice between aggressive intervention (risking disruption of legitimate sessions) and passive monitoring (risking completion of fraudulent sessions). The disclosed tiered response matrix maps composite scores to graduated security actions, enabling risk-proportionate intervention that balances security objectives against user experience considerations.

A seventh advantage is the confidence-weighted vector aggregation that accounts for per-module uncertainty. Prior fusion approaches typically apply fixed weights to component scores without regard to the confidence of each component. The disclosed dynamic weighting based on module-reported uncertainty values ensures that high-confidence signals exert appropriate influence while low-confidence signals are attenuated, improving overall detection accuracy and reducing false positive rates attributable to unreliable component outputs.

Further aspects, features, and advantages of the present disclosure will become apparent from the detailed description of embodiments that follows, taken in conjunction with the accompanying drawings and appended claims.

In one aspect, the present disclosure provides a system for real-time anomaly detection in audio signal streams as substantially described herein.

In another aspect, the present disclosure provides a method for real-time anomaly detection in audio signal streams as substantially described herein.

In another aspect, the present disclosure provides a non-transitory computer-readable medium storing instructions that, when executed by a processor, cause the processor to perform operations for real-time anomaly detection in audio signal streams as substantially described herein.

The foregoing summary is illustrative only and is not intended to be limiting. In addition to the illustrative aspects, embodiments, and features described above, further aspects, embodiments, and features will become apparent by reference to the drawings and the detailed description that follows.

BRIEF DESCRIPTION OF THE DRAWINGS

The accompanying drawings illustrate several embodiments and, together with the description, serve to explain the principles of the invention according to the embodiments. It will be appreciated by one skilled in the art that the particular arrangements illustrated in the drawings are merely exemplary and are not to be considered as limiting of the scope of the invention or the claims herein in any way.

FIG. 3B illustrates an exemplary computer implementation process for audio data ingestion and security protocol execution and orchestration.

DETAILED DESCRIPTION

Figure 1:
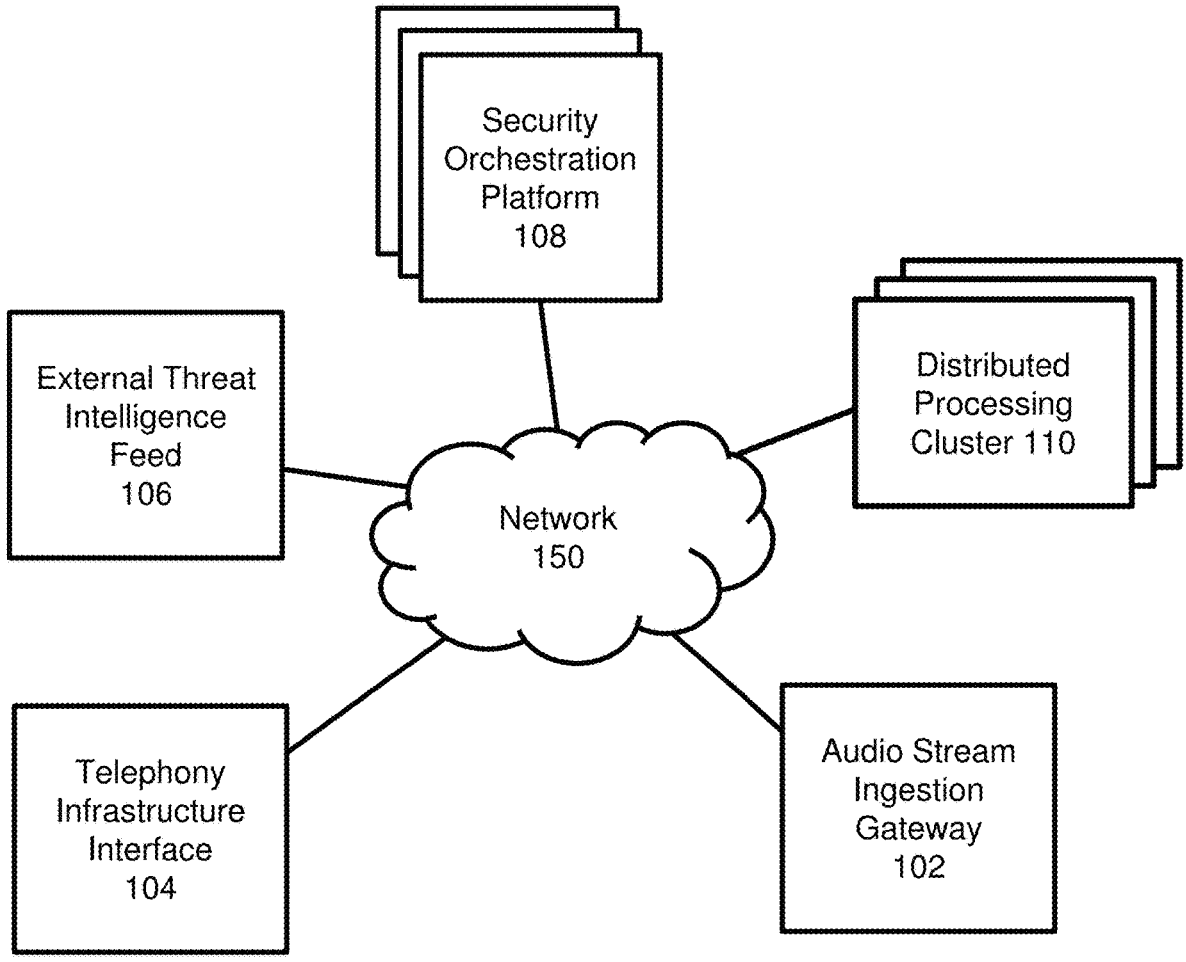
FIG. 1 illustrates a network architecture for Real-Time Multi-Modal Audio Anomaly Detection System in accordance with an exemplary embodiment of the invention.

One or more different embodiments may be described in the present application. Further, for one or more of the embodiments described herein, numerous alternative arrangements may be described; it should be appreciated that these are presented for illustrative purposes only and are not limiting of the embodiments contained herein or the claims presented herein in any way. One or more of the arrangements may be widely applicable to numerous embodiments, as may be readily apparent from the disclosure. In general, arrangements are described in sufficient detail to enable those skilled in the art to practice one or more of the embodiments, and it should be appreciated that other arrangements may be utilized and that structural, logical, software, electrical and other changes may be made without departing from the scope of the embodiments. Particular features of one or more of the embodiments described herein may be described with reference to one or more particular embodiments or figures that form a part of the present disclosure, and in which are shown, by way of illustration, specific arrangements of one or more of the aspects. It should be appreciated, however, that such features are not limited to usage in the one or more particular embodiments or figures with reference to which they are described. The present disclosure is neither a literal description of all arrangements of one or more of the embodiments nor a listing of features of one or more of the embodiments that must be present in all arrangements.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible embodiments and in order to more fully illustrate one or more embodiments. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the embodiments, and does not imply that the illustrated process is preferred. Also, steps are generally described once per aspect, but this does not mean they must occur once, or that they may only occur once each time a process, method, or algorithm is carried out or executed. Some steps may be omitted in some embodiments or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various embodiments in which, for example, functions may be executed out of order from that shown or discussed, including substantially concurrently or in reverse order, depending on the functionality involved, as would be understood by those having ordinary skill in the art.

The detailed description set forth herein in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Network Architecture

FIG. 1 illustrates an exemplary embodiment of Real-Time Multi-Modal Audio Anomaly Detection System according to one embodiment. The various components described herein are exemplary and for illustration purposes only and any combination or subcombination of the various components may be used as would be apparent to one of ordinary skill in the art. The system may be reorganized or consolidated, as understood by a person of ordinary skill in the art, to perform the same tasks on one or more other servers or computing devices without departing from the scope of the invention. More specifically, FIG. 1 illustrates a network architecture for real-time audio anomaly detection showing the system's integration with external communication infrastructure and security platforms. Components include: Audio Stream Ingestion Gateway (102), Telephony Infrastructure Interface (104), External Threat Intelligence Feed (106), Security Orchestration Platform (108), Distributed Processing Cluster (110), and the core Real-Time Audio Anomaly Detection System (100) connected via secure network channels.

The network interface module 102 is configured to handle multiple communication protocols and prepare audio data for parallel processing. The module 102 serves as an ingress point for audio communications, accepting connections from various telephony and web-based communication standards while providing signal conditioning and data distribution functionality.

The network interface module 102 receives real-time audio streams through multiple supported protocols including Session Initiation Protocol (SIP), Web Real-Time Communication (WebRTC), and Public Switched Telephone Network (PSTN) interfaces. Upon receipt of the audio streams, the module 102 performs initial signal conditioning operations to prepare the audio data for subsequent processing. The signal conditioning includes noise floor normalization, which establishes a consistent baseline noise level across different input sources, and dynamic range compression, which reduces the difference between the loudest and quietest portions of the audio signal to maintain consistent amplitude characteristics.

The module 102 implements a buffering mechanism to accommodate network jitter inherent in packet-based communication networks. Incoming audio packets are stored in a buffer structure that compensates for variations in packet arrival times, ensuring continuous audio stream availability for downstream processing components. Following the buffering and conditioning operations, the module 102 splits the processed audio stream into three parallel data paths. Each data path receives an identical copy of the conditioned audio stream, enabling simultaneous processing by different analysis components. To maintain coherence between the parallel processing paths, the module 102 inserts temporal synchronization markers into each data stream. These markers provide reference points that allow correlation of analysis results generated by different processing components operating on the parallel data paths.

Alternative implementations of the network interface module 102 may employ different communication protocols such as H.323 for video conferencing applications, Media Gateway Control Protocol (MGCP) for controlling telephony gateways, or Inter-Asterisk exchange (IAX) protocol for VoIP communications. The signal conditioning operations may alternatively include adaptive gain control, echo cancellation, or bandpass filtering to isolate specific frequency ranges. The buffering mechanism may be implemented using circular buffers, adaptive jitter buffers that adjust buffer depth based on network conditions, or priority-based queuing systems. The module 102 may split the audio stream into two, four, or more parallel paths depending on the number of concurrent analysis requirements. Alternative synchronization mechanisms may include timestamp insertion based on network time protocol (NTP), sequence numbering schemes, or frame-based synchronization markers aligned with audio codec frame boundaries. At a high level 104 comprises a telephony integration interface that establishes connectivity with telecommunications infrastructure and facilitates bidirectional communication between anomaly detection components and telephony systems. The telephony integration interface 104 serves as an intermediary layer that bridges security analysis functionality with existing telecommunications equipment and protocols.

The telephony integration interface 104 extracts and processes telecommunications signaling data from multiple sources within an organization's telephony infrastructure. The interface 104 connects to Private Branch Exchange (PBX) systems through protocols such as Computer Telephony Integration (CTI) or Session Initiation Protocol (SIP) trunking interfaces to obtain call control information and metadata. For Voice over Internet Protocol (VOIP) gateways, the interface 104 establishes connections using SIP, H.323, or Media Gateway Control Protocol (MGCP) to access packet-based voice communications data. When interfacing with call center infrastructure, the interface 104 connects to Automatic Call Distribution (ACD) systems, Interactive Voice Response (IVR) platforms, and workforce management systems through their respective Application Programming Interfaces (APIs) or protocol interfaces. The interface 104 extracts Automatic Number Identification (ANI) data that identifies the calling party's telephone number, Dialed Number Identification Service (DNIS) information that specifies the called number, and SIP header fields including From, To, Call-ID, Contact, and custom X-headers that contain additional call routing and identification parameters.

The telephony integration interface 104 maintains session state information by creating and updating data structures that track each active call session throughout its lifecycle. The interface 104 generates unique session identifiers that correlate telephony signaling events with corresponding audio streams being analyzed by anomaly detection components. The session state information includes call establishment timestamps, participant identifiers, call routing paths, protocol-specific parameters, and quality of service metrics. The interface 104 implements bidirectional control channels that receive anomaly detection results and translate them into telephony control commands. When an anomaly is detected, the interface 104 executes response actions by sending appropriate signaling messages to the connected telephony systems, such as SIP BYE messages for call termination, SIP REFER messages for call transfer operations, or API calls to modify call routing tables for redirecting suspicious calls to specialized handling queues.

Alternative implementations of the telephony integration interface 104 include deployment as a Session Border Controller (SBC) that sits at the network edge and processes all inbound and outbound call signaling while extracting metadata and implementing security policies. Another alternative involves implementing the interface 104 as a proxy server that intercepts and forwards SIP messages between endpoints while extracting header information and maintaining session state through dialog tracking mechanisms. The interface 104 can alternatively be implemented as a network packet capture system that passively monitors telephony traffic using port mirroring or network taps to extract signaling information without actively participating in call setup procedures. An alternative architecture deploys the interface 104 as a middleware service that connects to telephony systems through vendor-specific APIs such as Cisco's AXL (Administrative XML Layer) API, Avaya's TSAPI (Telephony Services API), or Microsoft's UCMA (Unified Communications Managed API). The interface 104 can alternatively utilize SIPREC (Session Recording Protocol) to receive replicated signaling and media streams from SIP-based systems that support call recording functionality. Another alternative implements the interface 104 as a softswitch or media gateway controller that directly processes telephony signaling protocols and maintains call state while interfacing with both circuit-switched and packet-switched networks.

The threat intelligence integration system 106 establishes connections with external cybersecurity data sources to obtain and process fraud-related threat indicators for use in fraud detection operations. The system 106 operates as an intermediary layer between external threat intelligence providers and internal fraud detection components, performing data acquisition, transformation, and storage functions to enable real-time access to current threat information.

The system 106 receives threat intelligence data by subscribing to real-time feeds from multiple cybersecurity vendors and fraud prevention networks through various communication protocols and data exchange formats. These feeds deliver continuously updated information regarding newly identified fraudulent phone numbers, malicious IP addresses, and attack signatures that have been detected across various networks and systems. The system 106 processes incoming threat data streams to extract relevant fraud indicators including phone numbers associated with fraudulent activities, IP addresses linked to malicious actors, behavioral patterns indicative of fraud attempts, and digital signatures corresponding to known attack methodologies.

The system 106 performs translation operations on received threat indicators by parsing external data formats, extracting relevant threat attributes, and converting these attributes into rule formats compatible with the deterministic rules engine. This translation process involves mapping external threat indicator schemas to internal rule syntax, transforming data types and structures to match engine requirements, and generating rule conditions and parameters based on threat indicator characteristics. The system 106 maintains a synchronized cache that stores processed threat data with configurable time-to-live values assigned to each data element. The cache enables rapid lookup operations during fraud analysis by providing indexed access to threat indicators, implementing expiration mechanisms based on TTL settings, and performing automatic refresh operations when data approaches expiration thresholds.

Alternative implementations of the system 106 include utilizing pull-based mechanisms where the system periodically queries threat intelligence APIs rather than maintaining persistent subscriptions, implementing distributed caching architectures using technologies such as Redis or Memcached for threat data storage, or employing message queue systems like Apache Kafka or RabbitMQ for receiving and processing threat intelligence streams. The translation functionality could alternatively be implemented using transformation languages such as XSLT or JSONPath for data mapping, employing machine learning models to automatically learn mapping relationships between external and internal formats, or utilizing standardized threat intelligence formats such as STIX/TAXII to reduce translation complexity. The caching mechanism could alternatively implement least recently used (LRU) eviction policies rather than TTL-based expiration, utilize bloom filters for space-efficient probabilistic lookups of threat indicators, or employ content delivery network (CDN) architectures for geographically distributed threat data access. At a high level 108 comprises a security integration interface that establishes bidirectional communication channels between voice authentication systems and enterprise security infrastructure. The system 108 facilitates the exchange of security-related data, alerts, and control signals between voice biometric authentication components and external security management platforms while maintaining operational synchronization across distributed security ecosystems.

The system 108 operates to aggregate anomaly detection events from voice authentication processes and transform them into standardized security incident formats compatible with enterprise SIEM and SOAR platforms. When suspicious authentication attempts or voice spoofing indicators are detected, the system 108 compiles comprehensive alert packages containing audio sample data, calculated risk scores, authentication decision trees, temporal metadata, and contextual information about the authentication session. These alert packages are transmitted to designated SIEM systems for centralized logging and correlation with other security events across the enterprise infrastructure. The system 108 simultaneously interfaces with SOAR platforms to enable automated response orchestration based on predefined security policies and threat thresholds. The system 108 receives disposition feedback from security analysts regarding alert validity, false positive classifications, and threat confirmations, incorporating this feedback into machine learning models for refinement of future anomaly detection accuracy.

The system 108 functions through API-based integration protocols that establish secure communication channels with external SIEM and SOAR platforms. Upon detection of anomalous voice authentication events, the system 108 formats alert data according to standardized security event schemas such as Common Event Format (CEF) or Log Event Extended Format (LEEF). Audio samples associated with suspicious authentication attempts are encoded and attached to alert payloads along with computed risk scores derived from voice biometric analysis, liveness detection results, and behavioral pattern deviations. The system 108 maintains persistent connections with SOAR platforms to receive automated response triggers, executing predetermined security actions including temporary account suspensions, elevation of authentication requirements to include additional verification factors, or activation of call recording mechanisms for forensic evidence collection. Feedback loops are established wherein security analyst determinations regarding alert dispositions are captured through REST API endpoints or message queue interfaces, with this feedback data being processed to update anomaly detection models and adjust risk scoring algorithms.

Alternative implementations of the system 108 include deployment of syslog-based event transmission protocols for SIEM integration, utilizing standardized syslog message formats to convey security alerts and authentication anomalies to centralized logging infrastructure. The system 108 may alternatively employ webhook-based notification mechanisms, wherein HTTP POST requests containing alert payloads are transmitted to configured endpoint URLs upon anomaly detection. Message queuing protocols such as AMQP or Apache Kafka may be utilized for asynchronous alert transmission and feedback collection, providing buffering and guaranteed delivery capabilities for security event data. The system 108 may implement SNMP trap mechanisms for real-time alert notification to network management systems. File-based integration approaches may be employed wherein alert data and audio samples are written to shared storage locations for periodic collection by SIEM platforms. The system 108 may utilize email-based alert distribution with MIME-encoded attachments containing audio samples and structured alert data. Database integration methods may be implemented wherein alert records are directly inserted into SIEM platform databases through JDBC or ODBC connections. The system 108 may employ gRPC-based communication protocols for high-performance bidirectional streaming of alert data and feedback information between voice authentication systems and security platforms.

The distributed processing coordination system 110 that manages computational resources across multiple interconnected compute nodes to enable horizontal scaling of audio processing operations. The system 110 orchestrates the distribution and execution of audio analysis tasks across a network of processing nodes while maintaining temporal synchronization and computational efficiency throughout the distributed architecture.

The system 110 performs several interconnected functions within the distributed processing environment. The system 110 coordinates the allocation and execution of audio analysis tasks across multiple compute nodes, enabling parallel processing of complex audio computations that would otherwise exceed the capacity of individual processing units. The system 110 implements load balancing mechanisms that evaluate the computational complexity of incoming audio analysis tasks and the available capacity of each node within the distributed network. Through this evaluation, the system 110 distributes workloads to optimize resource utilization and minimize processing latency. The system 110 maintains state synchronization across all participating nodes to ensure consistency in the distributed processing environment. When processing node failures occur, the system 110 provides failover capabilities that detect the failure condition and automatically migrate active processing sessions to available nodes without interrupting the audio analysis workflow. The system 110 aggregates partial analysis results generated by distributed processing modules and synthesizes these results into cohesive output while preserving sub-millisecond timing precision required for accurate audio analysis.

The system 110 operates through a multi-layered architecture that coordinates distributed processing activities. The load balancing algorithms within system 110 analyze incoming audio analysis tasks to determine their computational complexity based on factors such as sample rate, channel count, processing algorithm requirements, and expected execution time. The system 110 simultaneously monitors the capacity of each compute node by tracking metrics including processor utilization, memory availability, network bandwidth, and current task queue depth. Based on this analysis, the system 110 assigns tasks to nodes using distribution strategies that account for both task requirements and node capabilities. For state synchronization, the system 110 employs consensus protocols that ensure all nodes maintain consistent views of the distributed system state. These protocols coordinate state updates across nodes, resolve conflicts when concurrent modifications occur, and maintain data integrity throughout the distributed environment. The failover mechanism within system 110 continuously monitors node health through heartbeat signals and performance metrics. Upon detecting a node failure, the system 110 initiates session migration procedures that transfer active processing tasks and associated state information to healthy nodes. During the aggregation phase, the system 110 collects partial results from distributed modules, aligns these results based on temporal markers, and combines them while maintaining the sub-millisecond timing precision through timestamp reconciliation and clock synchronization mechanisms.

Alternative implementations of the distributed processing coordination system 110 may employ different architectural approaches and technologies. The load balancing component may utilize round-robin distribution, weighted round-robin based on node capacity, least-connections algorithms, or dynamic threshold-based distribution. The consensus protocols for state synchronization may implement Raft consensus algorithm, Paxos protocol, Byzantine fault-tolerant consensus, or eventually consistent replication with conflict resolution. The failover mechanism may employ active-passive replication with hot standby nodes, active-active replication with parallel processing, or checkpoint-based recovery with periodic state snapshots. The inter-node communication may utilize message passing interfaces (MPI), remote procedure calls (RPC), publish-subscribe messaging patterns, or distributed shared memory architectures. The timing synchronization for maintaining sub-millisecond precision may implement Network Time Protocol (NTP) with hardware timestamping, Precision Time Protocol (PTP/IEEE 1588), GPS-based time synchronization, or atomic clock references at each node. The task distribution may employ work-stealing algorithms where idle nodes request tasks from busy nodes, hierarchical distribution with master-worker patterns, or peer-to-peer task sharing with distributed hash tables. The state management may utilize distributed databases, replicated state machines, distributed caches with coherence protocols, or blockchain-based distributed ledgers for immutable state tracking.

User device(s) 110 include, generally, a computer or computing device including functionality for communicating (e.g., remotely) over a network 150. Data may be collected from user devices 110, and data requests may be initiated from each user device 110. User device(s) 110 may be a server, a desktop computer, a laptop computer, personal digital assistant (PDA), an in- or out-of-car navigation system, a smart phone or other cellular or mobile phone, or mobile gaming device, among other suitable computing devices. User devices 110 may execute one or more applications, such as a web browser (e.g., Microsoft Windows Internet Explorer, Mozilla Firefox, Apple Safari, Google Chrome, and Opera, etc.), or a dedicated application to submit user data, or to make prediction queries over a network 150.

In particular embodiments, each user device 110 may be an electronic device including hardware, software, or embedded logic components or a combination of two or more such components and capable of carrying out the appropriate functions implemented or supported by the user device 110. For example and without limitation, a user device 110 may be a desktop computer system, a notebook computer system, a netbook computer system, a handheld electronic device, or a mobile telephone. The present disclosure contemplates any user device 110. A user device 110 may enable a network user at the user device 110 to access network 150. A user device 110 may enable its user to communicate with other users at other user devices 110.

A user device 110 may have a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user device 110 may enable a user to enter a Uniform Resource Locator (URL) or other address directing the web browser to a server, and the web browser may generate a Hyper Text Transfer Protocol (HTTP) request and communicate the HTTP request to server. The server may accept the HTTP request and communicate to the user device 110 one or more Hyper Text Markup Language (HTML) files responsive to the HTTP request. The user device 110 may render a web page based on the HTML files from server for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

The user device 110 may also include an application that is loaded onto the user device 110. The application obtains data from the network 150 and displays it to the user within the application interface.

Exemplary user devices are illustrated in some of the subsequent figures provided herein. This disclosure contemplates any suitable number of user devices, including computing systems taking any suitable physical form. As example and not by way of limitation, computing systems may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the computing system may include one or more computer systems; be unitary or distributed; span multiple locations; span multiple machines; or reside in a cloud, which may include one or more cloud components in one or more networks. Where appropriate, one or more computing systems may perform without substantial spatial or temporal limitation one or more steps of one or more methods described or illustrated herein. As an example, and not by way of limitation, one or more computing systems may perform in real time or in batch mode one or more steps of one or more methods described or illustrated herein. One or more computing system may perform at different times or at different locations one or more steps of one or more methods described or illustrated herein, where appropriate.

Network cloud 150 generally represents a network or collection of networks (such as the Internet or a corporate intranet, or a combination of both) over which the various components illustrated in FIG. 1 (including other components that may be necessary to execute the system described herein, as would be readily understood to a person of ordinary skill in the art). In particular embodiments, network 150 is an intranet, an extranet, a virtual private network (VPN), a local area network (LAN), a wireless LAN (WLAN), a wide area network (WAN), a metropolitan area network (MAN), a portion of the Internet, or another network 150 or a combination of two or more such networks 150. One or more links connect the systems and databases described herein to the network 150. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable network 150, and any suitable link for connecting the various systems and databases described herein.

The network 150 connects the various systems and computing devices described or referenced herein. In particular embodiments, network 150 is an intranet, an extranet, a virtual private network (VPN), a local area network (LAN), a wireless LAN (WLAN), a wide area network (WAN), a metropolitan area network (MAN), a portion of the Internet, or another network 421 or a combination of two or more such networks 150. The present disclosure contemplates any suitable network 150.

One or more links couple one or more systems, engines or devices to the network 150. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable links coupling one or more systems, engines or devices to the network 150.

In particular embodiments, each system or engine may be a unitary server or may be a distributed server spanning multiple computers or multiple datacenters. Systems, engines, or modules may be of various types, such as, for example and without limitation, web server, news server, mail server, message server, advertising server, file server, application server, exchange server, database server, or proxy server. In particular embodiments, each system, engine or module may include hardware, software, or embedded logic components or a combination of two or more such components for carrying out the appropriate functionalities implemented or supported by their respective servers. For example, a web server is generally capable of hosting websites containing web pages or particular elements of web pages. More specifically, a web server may host HTML files or other file types, or may dynamically create or constitute files upon a request, and communicate them to client/user devices or other devices in response to HTTP or other requests from client devices or other devices. A mail server is generally capable of providing electronic mail services to various client devices or other devices. A database server is generally capable of providing an interface for managing data stored in one or more data stores.

In particular embodiments, one or more data storages may be communicatively linked to one or more servers via one or more links. In particular embodiments, data storages may be used to store various types of information. In particular embodiments, the information stored in data storages may be organized according to specific data structures. In particular embodiments, each data storage may be a relational database. Particular embodiments may provide interfaces that enable servers or clients to manage, e.g., retrieve, modify, add, or delete, the information stored in data storage.

The system may also contain other subsystems and databases, which are not illustrated in FIG. 1, but would be readily apparent to a person of ordinary skill in the art. For example, the system may include databases for storing data, storing features, storing outcomes (training sets), and storing models. Other databases and systems may be added or subtracted, as would be readily understood by a person of ordinary skill in the art, without departing from the scope of the invention.

System Architecture

Figure 2:
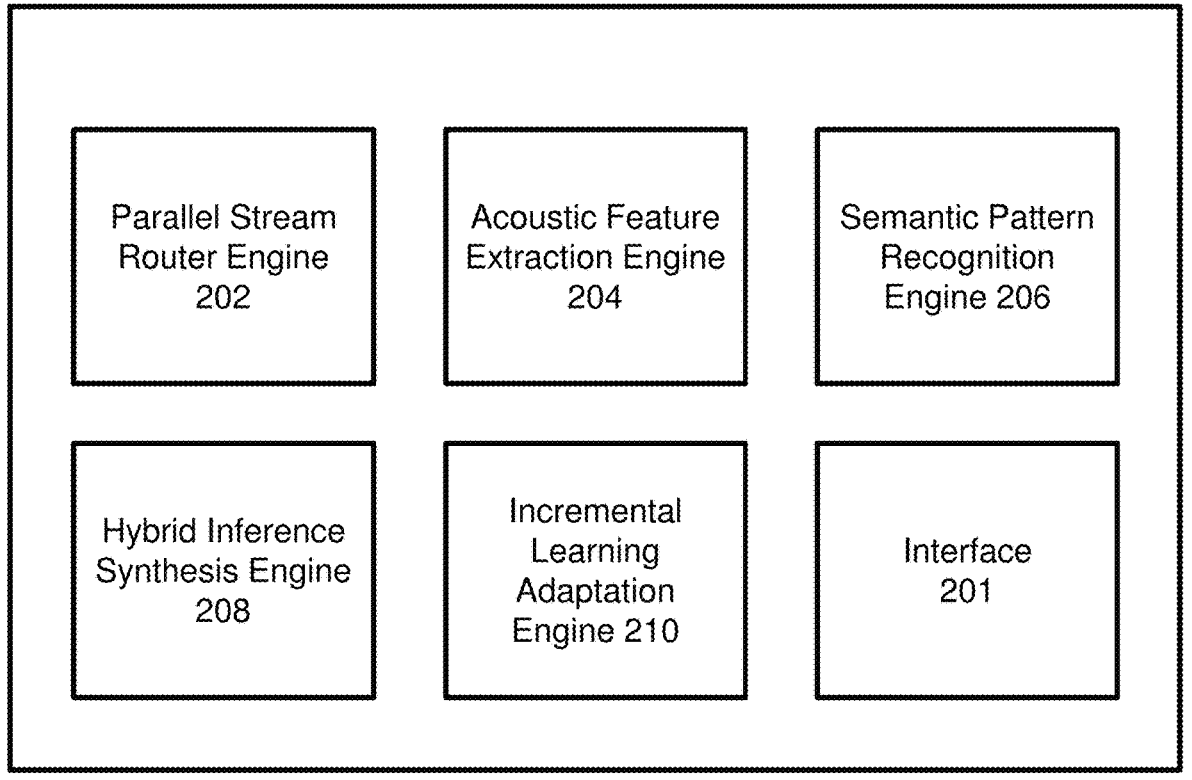
FIG. 2 illustrates a system architecture for Real-Time Multi-Modal Audio Anomaly Detection System in accordance with an exemplary embodiment of the present invention.

FIG. 2 illustrates an exemplary embodiment of the Real-Time Multi-Modal Audio Anomaly Detection System. The various components described herein are exemplary and for illustration purposes only and any combination or subcombination of the various components may be used as would be apparent to one of ordinary skill in the art. Other systems, interfaces, modules, engines, databases, and the like, may be used, as would be readily understood by a person of ordinary skill in the art, without departing from the scope of the invention. Any system, interface, module, engine, database, and the like may be divided into a plurality of such elements for achieving the same function without departing from the scope of the invention. Any system, interface, module, engine, database, and the like may be combined or consolidated into fewer of such elements for achieving the same function without departing from the scope of the invention. All functions of the components discussed herein may be initiated manually or may be automatically initiated when the criteria necessary to trigger action have been met. More specifically, FIG. 2 depicts the internal architecture of the Real-Time Audio Anomaly Detection System showing parallel processing modules and inference components. Subsystems include: Parallel Stream Router Engine (202), Acoustic Feature Extraction Engine (204), Semantic Pattern Recognition Engine (206), Hybrid Inference Synthesis Engine (208), and Incremental Learning Adaptation Engine (210).

At a high level, 202 comprises a software architecture configured for distributing audio data streams across multiple concurrent processing pathways while maintaining synchronization and data integrity. The subsystem 202 operates as an intermediary layer between audio input sources and downstream analysis modules, facilitating simultaneous processing of identical audio content through distinct computational pipelines.

The Parallel Stream Router Engine 202 performs distribution of incoming audio streams by creating multiple identical copies of the audio data for parallel processing. The subsystem 202 receives audio stream data from one or more input sources and generates three independent data streams, each containing identical audio content. These replicated streams are then routed to separate processing pipelines, enabling concurrent analysis of the same audio data using different processing methodologies or parameters. The subsystem 202 embeds temporal alignment markers within each duplicated stream to facilitate correlation of processing results from the different pipelines at later stages of the system operation.

In operation, the subsystem 202 employs a non-blocking architecture wherein incoming audio data is processed without introducing delays or bottlenecks in the data flow. When audio data arrives at the subsystem 202, the data is initially stored in a primary memory buffer. The subsystem 202 then implements zero-copy memory optimization techniques to create multiple references to the same underlying audio data, rather than creating physical copies of the data in memory. Each of the three processing pipelines receives a pointer or reference to the audio data along with metadata including temporal alignment markers. These markers comprise time-stamp information and sequence identifiers that enable downstream components to correlate processing results from the different pipelines. The subsystem 202 maintains separate buffer management structures for each pipeline, tracking the read position and processing status of each stream independently. The subsystem 202 monitors the operational status of each pipeline through health check mechanisms that detect processing delays, errors, or failures. Upon detection of an anomaly in one of the pipelines, the subsystem 202 initiates failover procedures to redirect the affected stream to a backup processing path.

Alternative embodiments of the subsystem 202 may implement different stream replication strategies. In one embodiment, the subsystem 202 may utilize a multicast approach where audio data is transmitted to multiple processing endpoints using network multicast protocols. Another embodiment may employ a publish-subscribe messaging pattern where processing pipelines subscribe to audio stream topics and receive data through a message broker. The subsystem 202 may alternatively implement a ring buffer architecture where multiple processing threads read from a shared circular buffer at different rates. In certain embodiments, the number of parallel streams may be configurable, allowing for two, four, or more concurrent processing pipelines based on system requirements. The temporal alignment mechanism may be implemented using alternative synchronization methods such as frame counters, sample indices, or GPS-synchronized timestamps. The failover mechanism may incorporate different redundancy strategies including hot standby processors, load balancing across multiple backup paths, or dynamic pipeline reconfiguration based on system load and resource availability. At a high level, 204 comprises a signal processing subsystem configured to transform audio data into a multidimensional feature space suitable for computational analysis of acoustic characteristics. The Acoustic Feature Extraction Engine 204 operates as an intermediate processing stage that converts raw audio waveforms into numerical representations that capture both spectral and temporal properties of the input signal.

The Acoustic Feature Extraction Engine 204 processes digitized audio samples to extract acoustic parameters that may indicate the presence of synthetic or manipulated speech. The subsystem 204 receives discrete-time audio signals and generates a plurality of feature vectors that encode spectral content, temporal dynamics, and signal quality metrics. These extracted features form a comprehensive acoustic fingerprint that facilitates downstream analysis of speech authenticity markers.

In operation, the Acoustic Feature Extraction Engine 204 employs multiple parallel processing pathways to extract complementary acoustic features. A spectral analysis pathway within 204 applies Fast Fourier Transform operations to windowed segments of the input audio signal, converting time-domain samples into frequency-domain representations. The FFT processing generates spectrograms that display the distribution of signal energy across frequency bins over time. A perceptual feature extraction pathway within 204 computes Mel-frequency cepstral coefficients by applying triangular filter banks to the power spectrum, wherein the filter spacing follows a Mel-scale frequency warping that approximates human auditory perception. The MFCC computation involves taking the discrete cosine transform of the log-energy outputs from the Mel-scaled filter banks.

A voice quality analysis pathway within 204 calculates perturbation measurements including jitter and shimmer values. Jitter quantification involves measuring cycle-to-cycle variations in fundamental frequency periods, while shimmer quantification involves measuring cycle-to-cycle variations in amplitude peaks. These measurements may reveal irregularities characteristic of voice synthesis systems. A formant tracking pathway within 204 identifies and traces the trajectories of spectral peaks corresponding to vocal tract resonances. The subsystem 204 analyzes the continuity and smoothness of formant transitions between phonemes, as discontinuities or unnatural trajectories may indicate audio splicing or concatenative synthesis.

A signal quality assessment pathway within 204 computes harmonic-to-noise ratios by separating periodic and aperiodic components of the speech signal. The ratio calculation involves identifying harmonic peaks in the spectrum and measuring their energy relative to inter-harmonic noise floors. Vocoder-generated speech may exhibit characteristic patterns in these ratios. An artifact detection pathway within 204 analyzes quantization noise patterns in the frequency domain by examining the statistical distribution of spectral coefficients. The subsystem 204 may detect compression artifacts by identifying periodic patterns in the noise floor that correspond to transform coding block boundaries.

Alternative embodiments of the Acoustic Feature Extraction Engine 204 may incorporate different or additional feature extraction methodologies. The spectral analysis component may utilize wavelet transforms or constant-Q transforms as alternatives to FFT-based processing. Linear predictive coding coefficients may be extracted as an alternative to or in conjunction with MFCCs. Perceptual linear prediction coefficients or gammatone frequency cepstral coefficients may serve as alternative perceptual feature representations. The voice quality analysis may incorporate additional measures such as harmonic richness factor, normalized amplitude quotient, or glottal-to-noise excitation ratio. Alternative formant tracking methods may employ linear prediction analysis, cepstral peak picking, or dynamic programming algorithms. The artifact detection component may utilize modulation spectrum analysis, entropy-based measures, or statistical moments of spectral distributions to identify synthetic speech characteristics. At a high level, 206 (Semantic Pattern Recognition Engine) comprises a multi-layered computational framework designed to analyze, interpret, and classify audio-derived linguistic content for the purpose of identifying fraudulent communication patterns. The subsystem 206 operates as an intermediary processing layer that receives audio input streams and generates structured semantic outputs suitable for downstream fraud determination modules.

The Semantic Pattern Recognition Engine 206 performs several interconnected functions within the broader system architecture. A first aspect of 206 involves the conversion of audio waveforms into textual representations through automatic speech recognition capabilities. A second aspect of 206 encompasses the linguistic analysis of transcribed content to detect manipulation tactics commonly employed in social engineering schemes. A third aspect of 206 relates to the maintenance and utilization of an evolving lexical database containing terminology associated with fraudulent activities. A fourth aspect of 206 concerns the computation of similarity metrics between incoming communications and previously catalogued fraud scripts. A fifth aspect of 206 involves the generation of sentiment-based feature vectors that characterize emotional manipulation attempts.

Regarding the operational methodology of 206, the automatic speech recognition component employs deep neural network architectures configured for streaming inference with minimal processing delay. In one embodiment, the neural network architecture comprises a series of convolutional layers followed by recurrent layers, such as Long Short-Term Memory (LSTM) or Gated Recurrent Unit (GRU) cells, which process sequential audio frames in real-time. The deep neural networks within 206 may be trained using connectionist temporal classification (CTC) loss functions or attention-based encoder-decoder frameworks to align audio features with corresponding phonetic or graphemic outputs. The low-latency streaming optimization of 206 may incorporate techniques such as chunk-wise processing, wherein audio is segmented into overlapping windows of predetermined duration, and incremental decoding, wherein partial transcription hypotheses are generated and refined as additional audio frames become available.

The natural language processing component of 206 implements a hierarchical analysis pipeline for identifying social engineering tactics. In one embodiment, 206 employs a first processing stage that performs tokenization, part-of-speech tagging, and dependency parsing on the transcribed text. A second processing stage within 206 applies named entity recognition to identify references to financial institutions, government agencies, or other authoritative bodies that may indicate authority impersonation attempts. A third processing stage within 206 utilizes trained classifiers to detect urgency creation patterns, which may include temporal pressure phrases, threat-based language, or artificial deadline constructions. The classifiers within 206 may comprise support vector machines, random forests, gradient boosting models, or transformer-based language models fine-tuned on labeled datasets of fraudulent and legitimate communications.

The dynamic dictionary component of 206 maintains a structured repository of fraud-related phrases, terminology, and linguistic patterns. In one embodiment, this dictionary is organized as a trie data structure or hash-based index that enables efficient lookup operations during real-time processing. The dictionary within 206 receives updates through a feedback loop mechanism that incorporates newly identified fraud indicators from confirmed fraud cases processed by the system. The update mechanism of 206 may implement versioning controls, wherein dictionary modifications are staged, validated against false positive metrics, and deployed according to predetermined release schedules. In another embodiment, the dictionary of 206 employs weighted entries, wherein each phrase or pattern is associated with a confidence score derived from historical fraud correlation data.

The semantic similarity computation component of 206 calculates quantitative measures of correspondence between incoming communications and a database of known fraud scripts. In one embodiment, 206 generates dense vector representations of transcribed text using embedding models such as Word2Vec, GloVe, FastText, or contextual embeddings derived from transformer architectures including BERT, ROBERTa, or domain-specific variants thereof. The similarity calculation within 206 may employ cosine similarity, Euclidean distance, or learned similarity functions operating on the embedded representations. In another embodiment, 206 implements sequence alignment algorithms adapted from bioinformatics, such as Smith-Waterman or Needleman-Wunsch algorithms, modified to operate on linguistic tokens rather than biological sequences. The fraud script database accessed by 206 may be organized using approximate nearest neighbor indexing structures, such as locality-sensitive hashing or hierarchical navigable small world graphs, to enable efficient similarity searches across large script collections.

The sentiment analysis component of 206 generates multi-dimensional feature vectors characterizing emotional content and manipulation patterns within analyzed communications. In one embodiment, 206 employs a sentiment classification model that outputs probability distributions across predefined emotional categories including fear, urgency, trust, and authority. The feature vectors produced by 206 may additionally encode temporal dynamics of sentiment progression throughout a communication session, capturing patterns such as escalating pressure tactics or alternating emotional appeals. In another embodiment, 206 implements aspect-based sentiment analysis to associate emotional indicators with specific topics or entities mentioned within the communication, thereby enabling detection of targeted emotional manipulation directed at particular decision points.

Alternative implementations of 206 may substitute different architectural approaches while maintaining functional equivalence. With respect to automatic speech recognition, 206 may alternatively employ hidden Markov model-based recognizers, hybrid DNN-HMM systems, or end-to-end transformer architectures such as Conformer or Wav2Vec 2.0. The natural language processing components of 206 may alternatively utilize rule-based pattern matching systems, regular expression engines operating on transcribed text, or symbolic reasoning frameworks that encode expert knowledge of fraud tactics. The dynamic dictionary of 206 may alternatively be implemented as a relational database with full-text search capabilities, a graph database encoding semantic relationships between fraud indicators, or a distributed key-value store for high-throughput access patterns. The semantic similarity computation of 206 may alternatively employ topic modeling approaches such as Latent Dirichlet Allocation, document fingerprinting techniques such as MinHash or SimHash, or retrieval-augmented generation frameworks that leverage large language models. The sentiment analysis component of 206 may alternatively utilize lexicon-based approaches with sentiment dictionaries such as VADER or SentiWordNet, ensemble methods combining multiple sentiment classifiers, or multimodal analysis incorporating prosodic features extracted directly from audio signals in conjunction with textual analysis. At a high level, 208 (Hybrid Inference Synthesis Engine) represents a software subsystem that functions as a multi-modal inference orchestration component designed to consolidate, reconcile, and synthesize outputs from a plurality of parallel analysis modules into unified risk assessments with associated confidence metrics. The subsystem 208 operates as an intermediary processing layer that receives heterogeneous analytical signals and produces composite anomaly determinations suitable for downstream consumption by decision-making components.

In terms of functional operation, the subsystem 208 performs several interconnected processing tasks. A first aspect of the invention is comprised of weighted aggregation functionality that combines outputs from parallel analysis modules. The weighted aggregation mechanism employs dynamically adjustable weights that may be modified during runtime based on contextual factors, historical performance metrics, or external configuration parameters. The weighting coefficients associated with each input channel may be represented as floating-point values that are applied multiplicatively to normalized input signals prior to summation or other combination operations.

A second aspect of the subsystem 208 is comprised of hierarchical gating logic that implements conditional signal routing based on confidence thresholds. The hierarchical gating architecture allows high-confidence anomaly signals to override other inputs when predetermined confidence criteria are satisfied. This gating mechanism may be implemented through a series of conditional evaluation nodes arranged in a tree-like structure, where signals propagate through successive gating stages. Each gating node may evaluate one or more input signals against configurable threshold values and determine whether to pass, attenuate, amplify, or substitute the signals proceeding to subsequent processing stages.

A third aspect of the subsystem 208 is comprised of an ensemble modeling component that maintains both gradient boosting models and neural network models for probabilistic risk scoring. The gradient boosting models may be implemented using decision tree ensembles constructed through iterative residual fitting procedures, where each successive tree in the ensemble is trained to correct errors made by preceding trees. The neural network models may comprise multi-layer perceptron architectures, recurrent neural network configurations, or transformer-based architectures depending on the temporal characteristics of the input data. The ensemble component aggregates predictions from both model families to produce probabilistic risk scores that benefit from the complementary strengths of each modeling approach.

A fourth aspect of the subsystem 208 is comprised of deterministic rule chain execution logic organized according to threat categories. The rule chains may be represented as directed acyclic graphs where nodes correspond to conditional predicates and edges represent logical transitions between evaluation states. Each threat category may be associated with one or more rule chains that encode domain-specific detection logic. The rule chain executor traverses these graph structures in a depth-first or breadth-first manner, evaluating predicates against current input states and accumulating rule activation signals that contribute to the final risk assessment.

A fifth aspect of the subsystem 208 is comprised of interpretability map generation functionality that produces explanatory artifacts showing the contribution of each input factor to the final risk score. The interpretability maps may be generated using techniques such as Shapley value decomposition, integrated gradients, attention weight extraction, or local interpretable model-agnostic explanations. These maps provide per-factor contribution scores that sum to the total risk score deviation from a baseline value, enabling downstream consumers to understand the relative influence of each analytical signal on the composite output.

A sixth aspect of the subsystem 208 is comprised of confidence interval computation logic that accompanies the composite anomaly scores. The confidence intervals may be derived through bootstrap resampling procedures, Bayesian posterior estimation, or ensemble disagreement quantification. The resulting intervals provide upper and lower bounds on the point estimate risk scores, enabling downstream components to account for estimation uncertainty in their decision processes.

With respect to implementation details, the weighted aggregation component of subsystem 208 may utilize vector-matrix multiplication operations where input signals are arranged as vectors and weight matrices encode the combination coefficients. The dynamically adjustable weights may be stored in a weight registry data structure that supports atomic update operations to ensure consistency during concurrent access. Weight adjustment may be triggered by feedback signals from downstream components, scheduled recalibration procedures, or drift detection mechanisms that identify changes in input signal distributions.

The hierarchical gating logic may be implemented through a state machine architecture where each state corresponds to a particular gating configuration. State transitions may be triggered by threshold crossings in the input signals or by temporal conditions such as sustained high-confidence detections over a specified duration. The gating hierarchy may comprise multiple levels, with lower levels handling fine-grained signal routing and higher levels implementing coarse-grained override behaviors.

The ensemble modeling component may maintain separate model registries for gradient boosting models and neural network models. Each registry may store multiple model versions along with associated metadata including training timestamps, validation performance metrics, and feature configuration specifications. Model inference may be performed in parallel across ensemble members, with results collected and aggregated through voting, averaging, or stacking procedures.

The rule chain execution component may utilize a rule engine that supports forward chaining inference, where satisfied rule antecedents trigger the assertion of new facts that may in turn satisfy additional rules. The threat category organization may be implemented through a namespace hierarchy that groups related rules and enables selective rule activation based on contextual indicators.

Regarding alternative implementations, the weighted aggregation functionality of subsystem 208 may alternatively be implemented using attention-based aggregation mechanisms where weights are computed dynamically based on input signal characteristics rather than maintained as persistent parameters. Another alternative comprises rank-based aggregation where input signals are converted to ordinal rankings prior to combination, providing robustness against outlier values.

The hierarchical gating logic may alternatively be implemented using fuzzy logic operators that provide gradual transitions between gating states rather than discrete threshold-based switching. Another alternative comprises learned gating functions implemented as small neural networks that take input signals and produce gating coefficients.

The ensemble modeling component may alternatively utilize random forest models, support vector machines, or Gaussian process models in place of or in addition to the gradient boosting and neural network models. Another alternative comprises a single unified model architecture that incorporates both tree-based and neural components within a hybrid differentiable framework.

The deterministic rule chain execution may alternatively be implemented using Rete algorithm optimizations for efficient pattern matching across large rule sets. Another alternative comprises compilation of rule chains into executable code that eliminates interpretation overhead during runtime evaluation.

The interpretability map generation may alternatively utilize counterfactual explanation methods that identify minimal input perturbations required to change the risk classification. Another alternative comprises prototype-based explanations that identify similar historical cases as justification for the current risk assessment.

The confidence interval computation may alternatively utilize conformal prediction methods that provide distribution-free coverage guarantees. Another alternative comprises Monte Carlo dropout techniques applied to neural network ensemble members to estimate predictive uncertainty. At a high level, 210 (Incremental Learning Adaptation Engine) constitutes a software subsystem configured to enable continuous model refinement and threat signature deployment without requiring complete system retraining or operational interruption. The subsystem 210 provides adaptive learning capabilities that maintain model currency while preserving computational efficiency and system stability through automated validation and rollback mechanisms.

Functional Description

The Incremental Learning Adaptation Engine 210 performs multiple coordinated functions within the broader system architecture. A first aspect of the invention is comprised of monitoring statistical drift between current data distributions and historical baseline distributions to detect when incoming data patterns deviate from the patterns upon which existing models were trained. The subsystem 210 implements online learning algorithms configured to incrementally update model parameters in response to new data without necessitating full model retraining cycles. An additional aspect of 210 involves maintaining a rule injection pipeline that enables rapid deployment of new threat signatures into the operational environment. The subsystem 210 further applies temporal weighting schemes to observation data and conducts effectiveness validation of newly deployed rules through controlled testing methodologies. A rollback capability within 210 provides automated reversion of updates when performance degradation is detected.

Operational Methodology

The statistical drift monitoring component of 210 employs Kullback-Leibler divergence metrics to quantify distributional differences between current data streams and reference distributions established during initial model training. In one embodiment, the subsystem 210 maintains sliding window buffers containing recent observations and periodically computes divergence scores against stored historical distribution parameters. When computed divergence values exceed predetermined thresholds, the subsystem 210 triggers adaptation procedures to address the detected drift.

The online learning algorithms implemented within 210 are configured to perform parameter updates using gradient-based optimization techniques applied to mini-batches of incoming data. In a particular embodiment, the subsystem 210 employs stochastic gradient descent variants with momentum terms to update neural network weights or other model parameters incrementally. The learning rate scheduling within 210 may be configured to balance adaptation speed against stability considerations. An aspect of the invention involves the subsystem 210 maintaining shadow model instances that receive incremental updates while production models continue serving requests, enabling validation prior to production deployment.

The rule injection pipeline of 210 comprises a structured workflow for ingesting new threat signatures from external sources or internal analysis processes. In one implementation, the subsystem 210 receives rule definitions in standardized formats and performs syntax validation, conflict detection against existing rule sets, and compilation into executable rule representations. The pipeline within 210 may include staging environments where new rules undergo preliminary testing before production deployment. A queueing mechanism within 210 manages rule deployment ordering and handles dependencies between related rules.

The temporal weighting functionality of 210 applies exponential time-decay functions to observation data such that recent observations receive greater influence on model updates than older observations. In a particular embodiment, the decay function implemented by 210 assigns weights according to the formula $w(t)=e^{\wedge}(-\lambda)(t\_current-t\_observation))$, where $\lambda$ represents a configurable decay constant. The subsystem 210 may maintain multiple decay constants for different data categories or model components. An aspect of this functionality involves the subsystem 210 periodically pruning or archiving observations whose weights fall below minimum thresholds to manage storage requirements.

The A/B testing capability within 210 validates rule effectiveness by directing portions of live traffic through experimental rule configurations while maintaining control groups processed by existing configurations. In one embodiment, the subsystem 210 implements traffic splitting using consistent hashing techniques to ensure reproducible assignment of traffic flows to experimental or control groups. The subsystem 210 collects performance metrics including detection rates, false positive rates, and processing latency for both groups. Statistical significance testing within 210 determines when sufficient data has been collected to draw conclusions regarding rule effectiveness.

The automatic rollback mechanism of 210 continuously monitors false positive rates and other configured performance indicators following rule deployments or model updates. When false positive rates exceed configured threshold values, the subsystem 210 initiates rollback procedures to restore previous model parameters or rule configurations. In a particular implementation, the subsystem 210 maintains versioned snapshots of model states and rule configurations to enable rapid restoration. The rollback logic within 210 may implement graduated responses including partial rollbacks affecting only specific model components or rule subsets identified as problematic.

Alternative Implementations

Alternative embodiments of the statistical drift monitoring within 210 may employ Jensen-Shannon divergence, Wasserstein distance metrics, or maximum mean discrepancy calculations in place of Kullback-Leibler divergence. In another alternative, the subsystem 210 may implement ensemble-based drift detection using multiple statistical tests with voting mechanisms to reduce false drift alarms.

The online learning algorithms of 210 may alternatively comprise elastic weight consolidation techniques, progressive neural networks, or experience replay mechanisms adapted from reinforcement learning methodologies. An alternative embodiment may implement the subsystem 210 using federated learning approaches where model updates are computed across distributed nodes before aggregation.

Alternative implementations of the rule injection pipeline within 210 may utilize domain-specific languages for rule specification, graphical rule construction interfaces, or natural language processing components that translate textual threat descriptions into executable rules. The pipeline may alternatively implement rule optimization passes that consolidate or reorder rules for improved execution efficiency.

The temporal weighting functions of 210 may alternatively employ linear decay, polynomial decay, or step-function decay schemes. In another alternative, the subsystem 210 may implement adaptive decay rates that adjust based on detected data volatility or domain-specific temporal patterns.

Alternative A/B testing implementations within 210 may utilize multi-armed bandit algorithms, Bayesian optimization techniques, or interleaved testing methodologies. The subsystem 210 may alternatively implement canary deployment patterns where new configurations receive gradually increasing traffic percentages.

The rollback mechanism of 210 may alternatively implement blue-green deployment patterns, feature flag systems enabling granular capability toggling, or chaos engineering approaches that proactively test rollback procedures. In another alternative embodiment, the subsystem 210 may implement predictive rollback that anticipates performance degradation based on early warning indicators rather than waiting for threshold violations.

Computer Implemented Process

The process steps described herein may be performed in association with a system such as that described in FIG. 1 and/or FIG. 2 above or in association with a different system. The process may comprise additional steps, fewer steps, and/or a different order of steps without departing from the scope of the invention as would be apparent to one of ordinary skill in the art.

Figure 3A:
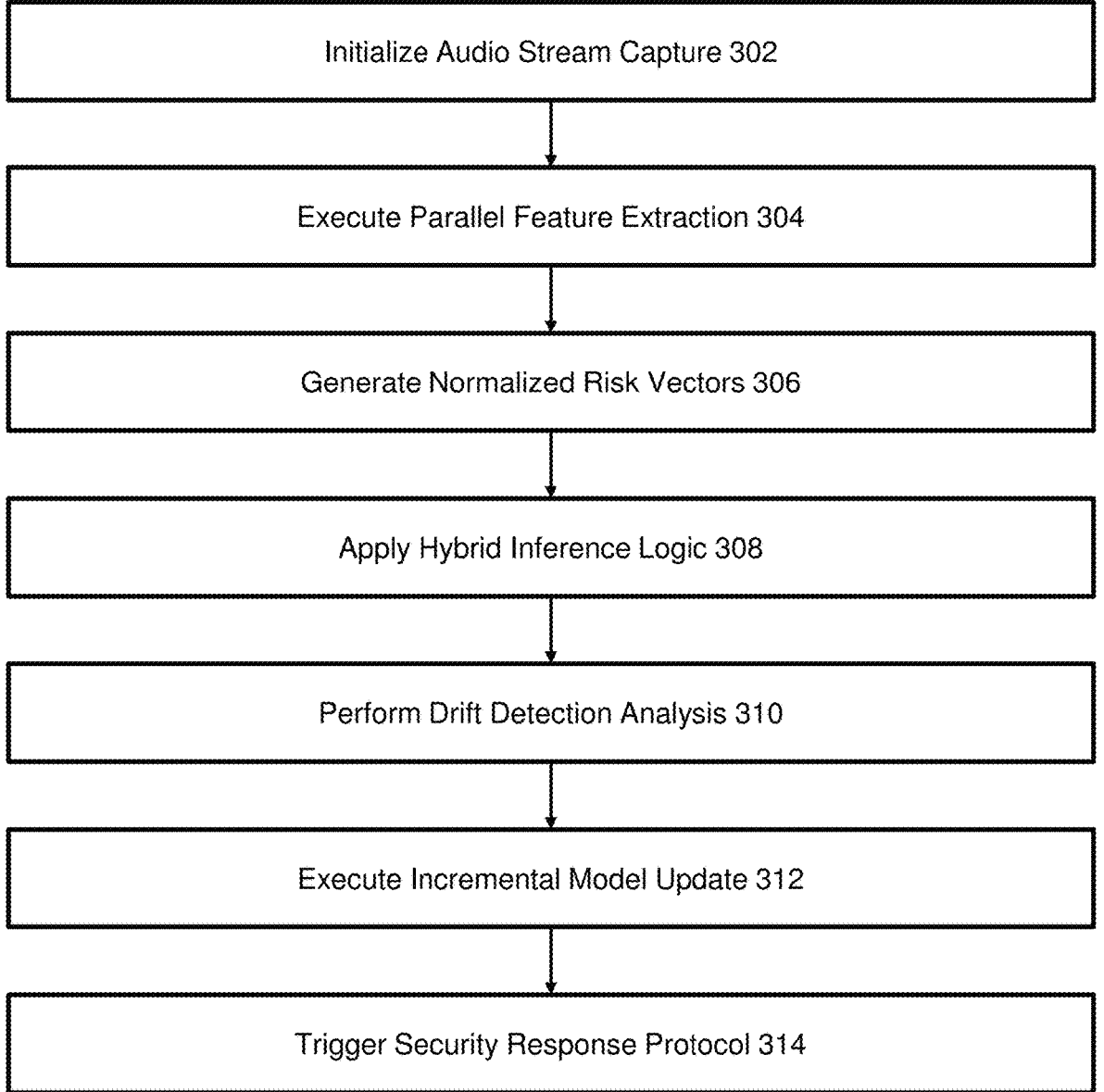
FIG. 3A illustrates an exemplary computer implemented process for Real-Time Multi-Modal Audio Anomaly Detection System according to one embodiment of the invention.

FIG. 3A describes the process of real-time anomaly detection in audio streams through parallel multi-modal analysis executed by a single processor to ensure unified control and avoid distributed actor issues. Process steps include: (302) Initialize Audio Stream Capture, (304) Execute Parallel Feature Extraction, (306) Generate Normalized Risk Vectors, (308) Apply Hybrid Inference Logic, (310) Perform Drift Detection Analysis, (312) Execute Incremental Model Update, and (314) Trigger Security Response Protocol.

At 302, the processor performs audio stream initialization and configuration operations that prepare the system for receiving and processing audio data in a manner suitable for subsequent acoustic analysis. At 302, the processor establishes a connection to an audio source through a network interface, which enables the receipt of audio data from remote or distributed sources over communication protocols. At 302, the audio source may comprise a microphone array, a media server, a streaming endpoint, a digital audio workstation, or any other device capable of transmitting audio data packets over a network connection.

At 302, the processor allocates memory buffers designated for storing incoming audio packets as they arrive from the audio source. At 302, these memory buffers provide temporary storage locations that accommodate variations in network latency and packet arrival timing, thereby enabling continuous audio data availability for downstream processing operations. At 302, the buffer allocation may employ circular buffer structures, double-buffering schemes, or dynamically sized buffer pools depending on implementation requirements and available system resources.

At 302, the processor configures a sampling rate parameter to a minimum of 16 kilohertz (16 kHz) to maintain acoustic analysis fidelity. At 302, this sampling rate configuration ensures that the captured audio data contains frequency components up to at least 8 kHz according to the Nyquist theorem, which provides adequate spectral resolution for speech recognition, environmental sound classification, acoustic event detection, and other analysis modalities. At 302, alternative sampling rates such as 22.05 kHz, 44.1 kHz, 48 kHz, or 96 kHz may be employed when higher frequency resolution is desired or when compatibility with particular audio formats is required.

At 302, the processor initializes temporal synchronization counters that enable multi-modal correlation between audio data and other data streams processed by the system. At 302, these temporal synchronization counters maintain timing references that allow audio frames to be aligned with corresponding video frames, sensor readings, or other time-stamped data sources for coordinated analysis. At 302, the temporal synchronization counters may utilize system clock references, network time protocol synchronization, precision time protocol timestamps, or embedded media timestamps depending on the synchronization accuracy requirements and available timing infrastructure.

At 302, the processor creates three parallel processing threads, each having an independent execution context, to prevent blocking during audio processing operations. At 302, the three parallel processing threads enable concurrent execution of distinct processing tasks such that computationally intensive operations on one thread do not impede the progress of operations executing on other threads. At 302, the independent execution contexts associated with each thread maintain separate stack memory, register states, and thread-local storage, which provides isolation between concurrent processing activities. At 302, alternative threading configurations may include two threads, four threads, or a dynamically scaled thread pool based on available processor cores and workload characteristics. At 302, alternative concurrency mechanisms such as asynchronous task queues, coroutine-based execution, event-driven processing loops, or hardware-accelerated processing pipelines may be substituted for the three-thread architecture while maintaining non-blocking audio processing capabilities. At 304, the processor simultaneously dispatches audio frames to three analysis pipelines operating in parallel. This step involves the concurrent distribution of audio frame data to multiple specialized processing pathways, wherein each pipeline performs distinct analytical operations on the audio data while sharing underlying memory resources through lock-free synchronization mechanisms.

At 304, the system executes a multi-pipeline audio analysis architecture that enables real-time extraction of acoustic features, semantic content, and transmission characteristics from audio frames. The simultaneous dispatch mechanism allows the processor to maximize computational throughput by leveraging parallel execution across the three analysis pipelines, thereby reducing overall processing latency compared to sequential analysis approaches.

At 304, the acoustic pipeline performs Fast Fourier Transform (FFT) operations on the incoming audio frames and extracts Mel-Frequency Cepstral Coefficients (MFCCs) using analysis windows of 25 milliseconds duration with 10 millisecond overlap between successive windows. The 25 ms window duration provides sufficient frequency resolution for speech analysis while the 10 ms overlap ensures temporal continuity and captures transitional acoustic events between adjacent frames. The FFT operation converts time-domain audio samples into frequency-domain representations, which are subsequently processed through a mel-scale filterbank and discrete cosine transform to produce the MFCC feature vectors.

At 304, the semantic pipeline executes automatic speech recognition (ASR) model inference utilizing a streaming transformer architecture. The streaming transformer architecture processes audio frames incrementally as they arrive, generating partial transcription hypotheses without requiring access to future audio context. This streaming approach enables low-latency semantic analysis suitable for real-time applications while maintaining recognition accuracy through the transformer's self-attention mechanisms.

At 304, the metadata pipeline extracts packet headers from the audio data stream and calculates transmission metrics based on the extracted header information. The packet header extraction identifies protocol-specific fields containing timing, sequencing, and quality indicators embedded within the audio transport layer. The transmission metrics calculated by this pipeline may include jitter measurements, packet loss statistics, and latency estimations derived from the header timestamp and sequence information.

At 304, all three pipelines operate on shared memory segments using lock-free data structures to coordinate access to the audio frame data. The lock-free data structures enable concurrent read access by multiple pipelines without requiring mutual exclusion primitives that would introduce blocking delays. The shared memory architecture eliminates data copying overhead between pipelines and reduces memory bandwidth consumption compared to approaches that replicate audio data for each pipeline.

At 304, alternative implementations may utilize different window configurations for the acoustic pipeline, such as 20 ms or 30 ms window durations with varying overlap percentages ranging from 40% to 60%, depending on the specific acoustic analysis requirements and computational constraints. Alternative feature extraction approaches at 304 may include linear predictive coding coefficients, perceptual linear prediction features, or filter bank energies in place of or in addition to MFCC extraction.

At 304, alternative ASR architectures may be employed in the semantic pipeline, including recurrent neural network transducers, connectionist temporal classification models, or hybrid hidden Markov model and deep neural network systems configured for streaming operation. The streaming transformer may alternatively be implemented using chunked attention mechanisms, triggered attention, or monotonic attention variants that constrain the attention window to previously processed frames.

At 304, alternative synchronization mechanisms for the shared memory segments may include read-copy-update patterns, hazard pointers, or epoch-based reclamation schemes that provide lock-free guarantees while managing memory lifecycle across the concurrent pipelines. Alternative memory architectures may employ message-passing interfaces between pipelines or utilize hardware-assisted memory coherence protocols available on specific processor architectures. At 306, the processor converts raw analysis outputs into standardized risk vectors, which represents a data transformation and normalization operation that prepares heterogeneous analytical results for uniform downstream consumption by subsequent processing modules within the system architecture.

At 306, the software process receives raw analysis outputs from one or more upstream analytical components, where such raw outputs may comprise acoustic anomaly detection results, semantic pattern matching results, and behavioral analysis results in their native formats and scales. The processor at 306 operates to transform these disparate data representations into a unified vector format that facilitates consistent interpretation and processing by downstream system components.

At 306, the processor applies sigmoid normalization to acoustic anomaly scores, wherein the sigmoid function maps unbounded anomaly score values to a constrained range between zero and one. The sigmoid normalization at 306 employs the mathematical function $\sigma(x)=1/(1+e^{-x})$, where x represents the raw acoustic anomaly score and $\sigma(x)$ represents the normalized output value. This normalization operation at 306 ensures that acoustic anomaly indicators of varying magnitudes are compressed into a standardized probability-like representation suitable for comparison with other normalized metrics within the risk vector.

At 306, the processor maps semantic patterns to a threat taxonomy with associated confidence scores, wherein identified semantic patterns from upstream natural language or content analysis are correlated with predefined threat categories maintained within the threat taxonomy data structure. The mapping operation at 306 generates confidence scores indicating the degree of correspondence between detected semantic patterns and each applicable threat category, producing a set of taxonomy-aligned confidence values that quantify the likelihood of various threat classifications based on semantic content analysis.

At 306, the processor calculates behavioral deviation metrics from historical baselines, wherein current behavioral indicators are compared against stored historical baseline data to determine the magnitude and direction of deviation from expected behavioral patterns. The behavioral deviation calculation at 306 may employ statistical distance measures, z-score computations, or other deviation quantification methodologies to express the degree to which observed behavior departs from established baseline norms.

At 306, the processor packages the normalized acoustic scores, taxonomy-mapped semantic confidence values, and behavioral deviation metrics into fixed-size tensors, wherein the tensor structure provides a consistent dimensional representation regardless of the specific content or values contained therein. The fixed-size tensor format at 306 enables efficient memory allocation, batch processing operations, and compatibility with downstream neural network or machine learning inference components that require uniform input dimensions.

At 306, the processor associates uncertainty quantification metrics with the packaged tensors, wherein such uncertainty metrics characterize the reliability, variance, or confidence intervals associated with the individual components of the risk vector. The uncertainty quantification at 306 may comprise variance estimates, entropy measures, or calibrated confidence bounds that enable downstream processing components to appropriately weight or interpret the risk vector values in light of their associated uncertainty characteristics.

At 306, the standardized risk vectors with associated uncertainty quantification metrics are made available for downstream processing, wherein subsequent system components may consume the uniformly formatted tensor data for decision-making, classification, aggregation, or other analytical operations.

Regarding alternative implementations at 306, the sigmoid normalization applied to acoustic anomaly scores may alternatively comprise tanh normalization, which maps values to a range between negative one and positive one, or min-max normalization based on observed or predetermined score ranges, or softmax normalization when multiple competing anomaly hypotheses require relative probability assignment. At 306, the threat taxonomy mapping may alternatively employ cosine similarity scoring between semantic pattern embeddings and taxonomy category embeddings, or hierarchical classification approaches that traverse the taxonomy structure to assign confidence scores at multiple granularity levels, or ensemble voting methods that aggregate multiple mapping algorithms to produce consolidated confidence scores.

At 306, the behavioral deviation metrics may alternatively be calculated using Mahalanobis distance to account for covariance structures in multivariate behavioral data, or using percentile-based deviation measures that express current behavior relative to historical distribution quantiles, or using dynamic time warping distances for temporal behavioral sequences that may exhibit phase shifts relative to baseline patterns. The fixed-size tensor packaging at 306 may alternatively employ sparse tensor representations when the risk vector contains predominantly zero or default values, or variable-length sequence representations with padding tokens when downstream components support such formats, or hierarchical tensor structures that preserve groupings among related risk indicators.

At 306, the uncertainty quantification may alternatively comprise Monte Carlo dropout-derived variance estimates, or ensemble disagreement metrics when multiple upstream models contribute to the raw analysis outputs, or Bayesian credible intervals derived from posterior distributions over risk parameters, or conformal prediction intervals that provide distribution-free coverage guarantees for the risk estimates. At 308, the processor executes a dual-path inference operation that processes the normalized vectors through two parallel analytical pathways to generate a comprehensive risk assessment output. This dual-path inference at 308 represents a computational methodology that simultaneously leverages machine learning-based probabilistic analysis and deterministic rule-based evaluation to produce a unified risk determination for the input data.

At 308, the dual-path inference operates by feeding the normalized vectors through an ensemble machine learning model that generates a probabilistic risk score. The ensemble ML model at 308 comprises multiple constituent models that each independently analyze the normalized vector data and produce individual probability estimates. These individual estimates are then combined through ensemble aggregation techniques to yield a probabilistic risk score that represents the likelihood of a threat condition being present in the analyzed data. The ensemble architecture at 308 provides robustness against individual model failures and reduces variance in the probabilistic output compared to single-model approaches.

At 308, the dual-path inference concurrently evaluates deterministic rule chains with pattern matching against threat signatures. The deterministic rule chains at 308 comprise ordered sequences of conditional logic statements that evaluate specific characteristics of the normalized vectors against predetermined threat signature patterns. The pattern matching operation at 308 compares vector features against a database of known threat signatures, where each signature represents a characteristic pattern associated with a particular threat category. The rule chain evaluation at 308 proceeds through the hierarchical rule structure, with each rule producing a binary or categorical output that feeds into subsequent rules in the chain.

At 308, the dual-path inference implements hierarchical gating where acoustic anomalies exceeding a 0.8 confidence threshold trigger immediate high-risk classification. The hierarchical gating mechanism at 308 establishes priority-based decision pathways that can bypass standard processing when specific conditions are satisfied. When the acoustic anomaly detection component at 308 produces a confidence value that exceeds the 0.8 threshold, the gating mechanism immediately assigns a high-risk classification to the analyzed data without requiring completion of the full scoring computation. This hierarchical gating at 308 enables rapid response to high-confidence threat indicators while allowing lower-confidence detections to proceed through the complete dual-path analysis.

At 308, the dual-path inference computes a weighted aggregate score with dynamically adjusted mixing coefficients based on module uncertainty levels. The weighted aggregation at 308 combines the probabilistic risk score from the ensemble ML model with the outputs from the deterministic rule chain evaluation. The mixing coefficients at 308 determine the relative contribution of each pathway to the final aggregate score. These mixing coefficients at 308 are dynamically adjusted based on the uncertainty levels reported by each processing module, such that modules exhibiting lower uncertainty receive higher weighting in the final aggregation. The uncertainty-based dynamic adjustment at 308 enables the system to automatically favor more confident assessments when combining the dual-path outputs.

At 308, the ensemble ML model may alternatively comprise a random forest classifier, a gradient boosting machine, a neural network ensemble, or a support vector machine ensemble, each of which can process the normalized vectors and generate probabilistic risk scores. At 308, the deterministic rule chain evaluation may alternatively employ finite state machine-based pattern matching, regular expression matching against serialized vector representations, or decision tree traversal for threat signature comparison. At 308, the hierarchical gating may alternatively utilize a threshold value other than 0.8, such as values in the range of 0.7 to 0.95, depending on the desired sensitivity-specificity tradeoff for the particular deployment context. At 308, the weighted aggregation may alternatively employ fixed mixing coefficients, Bayesian model averaging, or stacking-based meta-learning approaches to combine the dual-path outputs. At 308, the dynamic coefficient adjustment may alternatively be based on historical accuracy metrics, cross-validation performance estimates, or entropy-based uncertainty quantification rather than module-reported uncertainty levels. At 310, the processor calculates statistical divergence between current audio features and historical baseline distributions to detect concept drift and trigger adaptive responses when environmental or operational conditions deviate from established norms.

At 310, the system performs a comprehensive drift detection and monitoring operation that enables the invention to maintain accuracy and reliability over time by identifying when the statistical properties of incoming audio data have shifted relative to previously established baseline distributions. This operation addresses the fundamental challenge in machine learning systems where the underlying data distribution may change over time, potentially degrading model performance if left undetected and unaddressed.

At 310, the processor receives current audio features extracted from recent audio data and compares these features against historical baseline distributions that have been established during initial calibration or previous operational periods. The processor employs Kullback-Leibler divergence as the primary metric for quantifying the statistical difference between the current feature distribution and the historical baseline distribution. Kullback-Leibler divergence measures the relative entropy between two probability distributions, providing a non-negative value that equals zero when the distributions are identical and increases as the distributions diverge from one another. The processor computes the Kullback-Leibler divergence by evaluating the expectation of the logarithmic difference between the probability densities of the current distribution and the baseline distribution, integrated across the feature space.

At 310, the processor monitors multiple concept drift indicators to provide a comprehensive assessment of distribution changes. These indicators include anomaly rate changes, which track the frequency at which incoming audio samples are classified as anomalous relative to historical anomaly rates. The processor also monitors feature distribution shifts by analyzing changes in statistical moments such as mean values, variance, skewness, and kurtosis of individual audio features over time. The combination of these indicators enables the system to detect both gradual drift, where distributions slowly evolve over time, and sudden drift, where abrupt changes occur in the data characteristics.

At 310, the processor compares the calculated divergence values against calibrated thresholds that have been established based on acceptable tolerance levels for distribution changes. When the divergence exceeds these calibrated thresholds, the processor triggers an adaptation flag that signals to downstream components that model recalibration or retraining may be warranted. The calibrated thresholds may be set during system initialization based on empirical analysis of expected distribution variability or may be dynamically adjusted based on operational requirements.

At 310, the processor stores the computed drift metrics in a circular buffer data structure that maintains a fixed-size collection of recent drift measurements for trend analysis. The circular buffer overwrites the oldest entries when new measurements are added after the buffer reaches capacity, ensuring bounded memory usage while preserving access to recent historical drift data. The window sizes for trend analysis are configurable, allowing the system to be tuned for different operational contexts where shorter windows may be preferred for rapid response to drift or longer windows may be preferred for filtering transient fluctuations.

At 310, alternative statistical divergence measures may be employed in place of Kullback-Leibler divergence. Jensen-Shannon divergence provides a symmetric and bounded alternative that may be computed as the average of the Kullback-Leibler divergences between each distribution and their mixture distribution. Wasserstein distance, also known as Earth Mover's distance, measures the minimum cost of transforming one distribution into another and may be employed when the geometry of the feature space is relevant to the drift assessment. Hellinger distance provides another symmetric alternative that is bounded between zero and one, facilitating threshold calibration. Maximum Mean Discrepancy may be utilized as a kernel-based approach that does not require explicit density estimation.

At 310, alternative data structures may be employed for storing drift metrics. A sliding window buffer may be implemented using a deque data structure that supports efficient insertion and deletion at both ends. A time-stamped database table may be employed when persistent storage of drift metrics is desired for long-term analysis or regulatory compliance purposes. A hierarchical buffer structure may be utilized where multiple buffers with different granularities store drift metrics at various temporal resolutions.

At 310, alternative drift detection methodologies may be employed. Page-Hinkley test provides a sequential analysis approach that detects changes in the average of a Gaussian signal. ADWIN (Adaptive Windowing) automatically adjusts window sizes based on detected rate of change. DDM (Drift Detection Method) monitors error rates and triggers alerts based on statistical control limits. EDDM (Early Drift Detection Method) provides enhanced sensitivity to gradual drift by monitoring the distance between classification errors. At 312, the system executes an adaptive security update operation that dynamically modifies threat detection capabilities in response to identified drift conditions or confirmed threat identification events. This operation encompasses multiple coordinated sub-processes that collectively enable the security system to evolve its detection mechanisms while maintaining continuous operational availability.

At 312, the processor performs rule injection into a deterministic engine component upon receiving either a drift detection signal or a confirmed threat identification signal from upstream processing stages. The deterministic engine comprises a rule-based evaluation framework that applies predefined logical conditions to incoming data streams. The rule injection process involves parsing newly generated detection rules into a format compatible with the deterministic engine's evaluation syntax, allocating memory structures for the new rules within the engine's active rule set, and activating the rules for immediate application to subsequent data evaluations. The injection mechanism operates through a hot-swap architecture that permits modification of the active rule set without requiring service interruption, thereby maintaining continuous monitoring capabilities throughout the update process. The deterministic engine may be implemented as a finite state machine, a decision tree evaluator, a Boolean expression evaluator, or a pattern matching engine utilizing regular expressions or signature-based matching algorithms.

At 312, the system concurrently updates machine learning model parameters through an online gradient descent optimization procedure. The online gradient descent process computes parameter adjustments based on loss gradients derived from recent observation data, applying these adjustments incrementally to the model's weight matrices and bias vectors. The learning rate scheduling component modulates the magnitude of parameter updates according to a predetermined schedule, which may follow a step decay pattern, an exponential decay pattern, a polynomial decay pattern, or a cosine annealing pattern. The learning rate scheduler receives iteration count or epoch count as input and outputs a corresponding learning rate value that scales the gradient-based parameter updates. Alternative optimization approaches that may be employed at 312 include stochastic gradient descent with momentum, adaptive moment estimation (Adam), root mean square propagation (RMSprop), or Nesterov accelerated gradient methods.

At 312, the processor applies exponential decay weighting to historical pattern data maintained within the system's pattern repository. The exponential decay function assigns multiplicative weight factors to stored patterns based on their temporal age, with more recent observations receiving higher weight values than older observations. The decay operation may be expressed mathematically as a function that multiplies each historical pattern's contribution by a decay factor raised to a power proportional to the time elapsed since the pattern's initial observation. This weighting scheme causes the system's detection behavior to preferentially reflect recent threat landscape characteristics while gradually diminishing the influence of potentially outdated pattern information. Alternative decay functions that may be implemented at 312 include linear decay, polynomial decay, step function decay, or sliding window approaches that entirely discard observations beyond a specified temporal threshold.

At 312, the system performs validation of the proposed updates against a holdout test set prior to committing the modifications. The holdout test set comprises a reserved portion of labeled data samples that were excluded from the training process and thus provide an independent evaluation benchmark. The validation procedure applies the updated model parameters and detection rules to the holdout samples, computes performance metrics including detection accuracy, false positive rate, and false negative rate, and compares these metrics against predefined acceptance thresholds. When validation metrics indicate potential over-fitting conditions, characterized by degraded performance on the holdout set relative to training performance, the system may reject the proposed updates, reduce the magnitude of parameter changes, or apply regularization adjustments. Alternative validation approaches that may be employed at 312 include cross-validation procedures, bootstrap sampling validation, or temporal validation using time-ordered data partitions.

At 312, upon successful validation, the processor commits the validated updates to persistent storage with version control metadata enabling subsequent rollback operations. The persistent storage system maintains a versioned history of model parameters, detection rules, and pattern weights, with each version tagged with temporal identifiers and associated performance metrics. The commit operation writes the updated configuration data to non-volatile storage media, updates index structures to reference the new version as the active configuration, and preserves prior versions in an accessible archive. The rollback capability permits restoration of any previously committed configuration version in response to detected performance degradation or operational anomalies. The persistent storage implementation at 312 may utilize relational database systems, document-oriented databases, distributed file systems, object storage systems, or specialized model registry platforms designed for machine learning artifact management. At 314, when the composite anomaly score exceeds a configured threshold, the processor generates a detailed alert package and initiates a multi-faceted response protocol designed to address detected anomalous activity within the communication system.

At 314, the software process operates as an automated threat response and documentation mechanism that activates upon determination that aggregated anomaly indicators have surpassed predetermined acceptable limits. The process at 314 serves to transition the system from a detection phase to an active response phase, ensuring that identified threats receive appropriate attention from both automated systems and human analysts while maintaining comprehensive records suitable for regulatory compliance and system refinement.

At 314, the processor first constructs a detailed alert package comprising multiple data elements. The alert package includes a risk score that quantifies the severity of the detected anomaly based on the composite scoring methodology employed in preceding processing stages. The alert package further includes contributing factors that identify which specific anomaly indicators or combinations thereof resulted in the threshold exceedance. Additionally, the alert package incorporates an audio sample extracted from the communication session, enabling human analysts to perform qualitative assessment of the flagged interaction. The audio sample may comprise a complete recording of the session or a targeted excerpt corresponding to temporal segments where anomalous behavior was detected.

At 314, upon construction of the alert package, the processor transmits a notification to a security operations center through an encrypted channel. The encryption methodology ensures confidentiality and integrity of the transmitted data during transit across network infrastructure. The security operations center receives the notification in a format compatible with existing security information and event management systems, enabling integration with broader organizational security workflows.

At 314, the processor optionally executes automated response actions based on configuration parameters and the nature of the detected anomaly. Such automated responses may include call termination, wherein the processor instructs switching equipment to disconnect the active communication session. Alternatively, the automated response may comprise routing to a fraud specialist, wherein the processor redirects the communication session to a queue monitored by trained personnel equipped to handle potentially fraudulent interactions. The selection between automated response options may be governed by policy rules that consider factors including the magnitude of the risk score, the specific contributing factors identified, time-of-day considerations, and available specialist resources.

At 314, the processor logs a full decision path accompanied by an interpretability map to establish an audit trail. The decision path documentation captures the sequence of analytical operations performed, the intermediate results generated at each processing stage, and the logical flow that culminated in the threshold exceedance determination. The interpretability map provides a structured representation of how individual features and anomaly indicators contributed to the final composite score, enabling retrospective analysis by compliance personnel, system administrators, or external auditors. The logging mechanism stores this information in a persistent data store with appropriate access controls and retention policies.

At 314, the processor updates a feedback queue to facilitate continuous learning based on analyst disposition. The feedback queue maintains records of alerts pending analyst review and captures disposition information indicating whether analysts confirmed the alert as a true positive, classified it as a false positive, or assigned alternative categorizations. This disposition data subsequently informs model retraining operations, threshold adjustment procedures, and feature engineering efforts designed to improve detection accuracy over time.

At 314, alternative implementations may be employed for various aspects of the described process. With respect to alert package transmission, the processor may utilize alternative secure communication protocols including Transport Layer Security, Secure Shell tunneling, or virtual private network encapsulation rather than dedicated encrypted channels. The notification destination may alternatively comprise a distributed team of analysts rather than a centralized security operations center, with routing logic that directs alerts based on analyst expertise, workload balancing, or geographic considerations.

At 314, alternative automated response mechanisms may include account flagging for enhanced monitoring during subsequent interactions, temporary restriction of account privileges pending manual review, or generation of challenge prompts requiring additional authentication from the communication participant. The processor may alternatively implement graduated response protocols wherein initial threshold exceedances trigger less intrusive responses while repeated or severe exceedances invoke more aggressive countermeasures.

At 314, alternative approaches to audit trail maintenance may include blockchain-based logging mechanisms that provide immutable records with cryptographic verification, distributed ledger implementations that replicate audit data across multiple storage nodes, or hierarchical logging architectures that maintain summary records locally while transmitting detailed records to centralized repositories. The interpretability map may alternatively be generated using techniques such as LIME (Local Interpretable Model-agnostic Explanations), SHAP (SHapley Additive explanations), or attention weight extraction for neural network-based scoring components.

At 314, the feedback queue may alternatively be implemented as a real-time streaming pipeline rather than a batch-oriented queue, enabling immediate incorporation of analyst feedback into active detection models. The continuous learning mechanism may alternatively employ reinforcement learning frameworks, active learning strategies that prioritize analyst review of uncertain cases, or federated learning approaches that aggregate feedback across multiple deployment instances while preserving data locality constraints.

FIG. 3B illustrates an exemplary process flow diagram depicting a computer-implemented method for real-time anomaly detection in audio signal streams, wherein a processor executes sequential and parallel operations to ingest audio data, generate multi-modal feature vectors, synthesize composite anomaly scores through a hybrid inference engine, and dynamically adapt detection parameters based on feedback signals. The process steps described herein are performed by a single processor or processing system executing stored instructions, thereby maintaining unified actor control throughout the method. The process may comprise additional steps, fewer steps, and/or a different order of steps without departing from the scope of the invention as would be apparent to one of ordinary skill in the art. All operations described herein are executed by the processor in response to instructions stored in memory associated with the processor.

At a high level, process step 402 comprises an audio signal stream ingestion and session initialization operation wherein the processor receives a real-time audio signal stream associated with a communication session and establishes the computational context required for subsequent multi-modal analysis operations. Process step 402 represents the entry point of the anomaly detection method, wherein the processor transitions from an idle monitoring state to active processing upon detection of an incoming communication session.

At process step 402, the processor performs several interconnected initialization and ingestion functions. The processor establishes a connection to receive the real-time audio signal stream through a network interface configured to accept audio data packets transmitted via communication protocols. The processor allocates memory buffers designated for temporary storage of incoming audio samples to accommodate network latency variations and ensure continuous data availability for downstream processing operations. The processor extracts transmission metadata from signaling information and packet headers associated with the audio signal stream, capturing contextual attributes that will subsequently be utilized by the contextual metadata module to generate the behavior vector. The processor initializes temporal synchronization structures that enable correlation of audio frames across the parallel processing pathways to be instantiated in subsequent process steps. The processor configures sampling rate parameters and audio format specifications to ensure acoustic analysis fidelity throughout the processing pipeline.

In operation at process step 402, the processor monitors a network interface for incoming audio signal streams by polling socket connections, processing interrupt signals, or dequeuing messages from an audio ingestion message queue. Upon detection of an incoming communication session, the processor extracts session initiation metadata including originating network identifiers derived from source IP addresses or telephony signaling headers, device fingerprint attributes derived from user-agent strings or protocol-specific device identifiers, session timing characteristics including session start timestamp and time-of-day classification, and carrier type classification derived from network routing information or protocol indicators distinguishing Voice over Internet Protocol traffic from Public Switched Telephone Network traffic. The processor stores the extracted transmission metadata in a session context data structure that persists throughout the duration of the communication session and remains accessible to the contextual metadata module during behavior vector generation. The processor allocates circular buffer memory structures sized to accommodate configurable buffering durations, typically ranging from 100 milliseconds to 500 milliseconds, to compensate for network jitter while minimizing introduced latency. The processor configures audio processing parameters including sample rate, which is set to a minimum of 16 kilohertz to maintain sufficient frequency resolution for acoustic analysis, bit depth, channel configuration, and audio frame duration. The processor initializes a session state machine that tracks the processing status of the communication session through states including initialization, active processing, anomaly detected, and session terminated. The processor generates a unique session identifier that enables correlation of processing outputs, alert records, and feedback signals associated with the communication session throughout the system.

Alternative implementations of process step 402 may receive audio signal streams through different transport mechanisms including Real-time Transport Protocol streams encapsulated in User Datagram Protocol packets, WebSocket connections carrying audio frames in binary message payloads, HTTP chunked transfer encoding for progressive audio delivery, or shared memory interfaces for co-located audio sources. The processor may alternatively extract transmission metadata from Session Initiation Protocol INVITE messages, H.323 Setup messages, or proprietary signaling protocols associated with specific communication platforms. The buffer allocation may alternatively employ double-buffering schemes, dynamically sized buffer pools that adjust capacity based on observed jitter characteristics, or ring buffer implementations with configurable read and write pointer management. The processor may alternatively receive pre-extracted metadata through API parameters accompanying the audio stream rather than parsing metadata from protocol headers directly. The session state machine may alternatively be implemented as an event-driven finite state machine, a hierarchical state machine with nested substates, or a statechart with concurrent orthogonal regions.

At a high level, process step 404 comprises a parallel processing architecture instantiation and stream routing operation wherein the processor simultaneously routes the audio signal stream to a semantic analysis module, an acoustic feature module, and a contextual metadata module through parallel execution pathways. Process step 404 establishes the concurrent processing topology that enables independent multi-modal analysis of the audio signal stream, wherein each analysis module operates without dependency on outputs from the other modules.

At process step 404, the processor performs several interconnected distribution and routing functions. The processor instantiates three parallel execution contexts corresponding to the semantic analysis module, the acoustic feature module, and the contextual metadata module. The processor replicates audio frame data for distribution to each parallel execution context, ensuring that each module receives identical audio content for analysis. The processor routes the audio signal stream to the semantic analysis module for conversion to text and identification of semantic patterns. The processor simultaneously routes the audio signal stream to the acoustic feature module operating independently of the semantic analysis module for spectral analysis to identify non-semantic synthetic voice artifacts. The processor simultaneously routes the transmission metadata extracted during process step 402 to the contextual metadata module for behavior vector generation. The processor embeds temporal alignment markers within each data stream to enable subsequent correlation of analysis outputs generated by the parallel modules.

In operation at process step 404, the processor implements the parallel processing architecture by spawning concurrent execution threads, scheduling asynchronous tasks on an event loop, or dispatching work items to a thread pool managed by the processor. The processor creates three independent execution contexts with separate stack memory, local variable storage, and execution state to ensure isolation between the parallel processing pathways. The processor implements zero-copy buffer sharing wherein each parallel execution context receives a pointer or reference to the same underlying audio frame data in memory rather than creating physical copies of the audio data, thereby minimizing memory bandwidth consumption and reducing latency overhead associated with data duplication. The processor assigns the semantic analysis module execution context to receive the audio signal stream along with a reference to a speech recognition model and natural language processing classifiers required for content vector generation. The processor assigns the acoustic feature module execution context to receive the audio signal stream along with configuration parameters for spectral analysis including Fast Fourier Transform window size, hop length, and frequency bin specifications, wherein the acoustic feature module is configured to operate independently without receiving, depending upon, or being influenced by outputs from the semantic analysis module. The processor assigns the contextual metadata module execution context to receive the transmission metadata extracted during process step 402 along with access to historical behavioral baseline data required for deviation metric calculation. The processor implements non-blocking dispatch mechanisms that initiate execution of all three parallel pathways without waiting for completion of any individual pathway, enabling true concurrent processing that minimizes overall latency compared to sequential processing approaches. The processor inserts frame sequence numbers and timestamps into each data stream as temporal alignment markers that enable correlation of outputs when the parallel pathways converge at subsequent process steps.

Alternative implementations of process step 404 may employ multiprocessing architectures wherein each parallel pathway executes on a separate processor core with inter-process communication through shared memory regions or message passing interfaces. The processor may alternatively implement the parallel architecture using coroutine-based concurrency with cooperative multitasking managed by an async runtime. The processor may alternatively utilize Single Instruction Multiple Data (SIMD) vectorized operations to process multiple analysis pathways using data-level parallelism within a single execution thread. The stream routing may alternatively employ publish-subscribe messaging patterns wherein each analysis module subscribes to an audio frame topic and receives frames through a message broker abstraction. The processor may alternatively implement the parallel pathways as separate microservices communicating through inter-process communication mechanisms including Unix domain sockets, named pipes, or localhost network connections, while maintaining unified processor control over all pathways. The temporal alignment markers may alternatively comprise sample index counters, Precision Time Protocol timestamps, or audio codec frame boundary identifiers.

At a high level, process step 406 comprises a multi-modal feature vector generation operation wherein the processor concurrently executes the semantic analysis module, the acoustic feature module, and the contextual metadata module to generate the content vector, the signal artifact vector, and the behavior vector, respectively. Process step 406 represents the core analytical processing stage wherein the processor extracts heterogeneous features from the audio signal stream and associated metadata to characterize semantic content, acoustic artifacts, and behavioral patterns.

At process step 406, the processor performs several interconnected feature extraction and vector generation functions across the three parallel modules. Via the semantic analysis module, the processor generates the content vector based on converting the audio signal stream into text and identifying semantic patterns indicative of anomalous content. Via the acoustic feature module operating independently of the semantic analysis module, the processor generates the signal artifact vector by performing spectral analysis on the audio signal stream to identify non-semantic synthetic voice artifacts including frequency discontinuities and pitch modulation inconsistencies. Via the contextual metadata module, the processor generates the behavior vector based on transmission metadata associated with the audio signal stream. The processor analyzes spectral energy distribution of the audio signal stream to detect digital compression artifacts that are indicative of synthetic audio generation, wherein said compression artifacts are undetectable by the semantic analysis module. The processor measures consistency of a background noise floor during periods of active speech, and the signal artifact vector flags the audio signal stream as anomalous when the background noise floor exhibits digital silence or frequency discontinuities characteristic of deepfake splicing.

In operation at process step 406, the processor executes the semantic analysis module by first applying automatic speech recognition model inference to convert the audio signal stream into text. The processor loads a streaming transformer neural network architecture or equivalent speech recognition model into memory and processes sequential audio frames through the model to generate incremental transcription hypotheses. The processor applies connectionist temporal classification decoding or attention-based decoding to align acoustic features with textual output tokens. Upon generating transcribed text, the processor applies natural language processing classifiers to identify semantic patterns including social engineering tactic indicators such as urgency phrases, authority impersonation language, and requests for sensitive information. The processor encodes identified semantic patterns along with confidence scores into the content vector data structure. Concurrently, the processor executes the acoustic feature module by applying Fast Fourier Transform operations to windowed segments of the audio signal stream using analysis windows of 20 to 30 milliseconds with 10 millisecond overlap to generate frequency-domain representations. The processor computes Mel-frequency cepstral coefficients by applying triangular filter banks to the power spectrum followed by discrete cosine transform operations. The processor analyzes the spectral energy distribution across frequency bands to detect digital compression artifacts indicative of synthetic audio generation, identifying periodic patterns in the noise floor corresponding to transform coding block boundaries or neural vocoder artifacts that are discarded by the speech recognition process and therefore undetectable by the semantic analysis module. The processor identifies frequency discontinuities by detecting abrupt changes in spectral energy distribution between adjacent time frames that are inconsistent with natural speech production physiology. The processor detects pitch modulation inconsistencies by analyzing fundamental frequency contour trajectories and identifying irregular variations that deviate from natural prosodic patterns. The processor measures background noise floor consistency during periods of active speech by computing noise floor energy levels between voiced segments and detecting digital silence manifesting as unnaturally low noise floor levels or frequency discontinuities at splice boundaries characteristic of deepfake audio concatenation. The processor encodes detected synthetic voice artifacts into the signal artifact vector data structure. Concurrently, the processor executes the contextual metadata module by comparing transmission metadata against historical behavioral baselines retrieved from a behavioral profile database. The processor calculates deviation metrics including geographic deviation scores comparing originating network location against historically observed locations, temporal deviation scores comparing session timing against historical activity patterns, and device deviation scores comparing device fingerprints against enrolled device profiles. The processor encodes behavioral deviation metrics into the behavior vector data structure.

Alternative implementations of process step 406 may employ different speech recognition architectures within the semantic analysis module including recurrent neural network transducers, hybrid hidden Markov model and deep neural network systems, or Wav2Vec 2.0 self-supervised architectures. The natural language processing classifiers may alternatively utilize rule-based pattern matching with regular expressions, symbolic reasoning systems encoding expert knowledge, or large language model embeddings with similarity-based classification. The acoustic feature module may alternatively extract linear predictive coding coefficients, perceptual linear prediction features, gammatone frequency cepstral coefficients, or modulation spectrum features. The spectral analysis may alternatively employ wavelet transforms, constant-Q transforms, or Gabor filter banks. The compression artifact detection may alternatively analyze codec-specific artifact patterns associated with MP3, AAC, Opus, or proprietary speech codecs. The behavioral baseline comparison may alternatively employ Mahalanobis distance calculations, percentile-based deviation scoring, or dynamic time warping for temporal pattern comparison.

At a high level, process step 408 comprises a vector normalization and standardization operation wherein the processor transforms the content vector, the signal artifact vector, and the behavior vector from their native analytical scales into a standardized probability scale suitable for unified processing by the hybrid inference engine. Process step 408 ensures commensurability of heterogeneous feature representations generated by the three analysis modules, enabling meaningful aggregation and comparison of multimodal anomaly indicators.

At process step 408, the processor performs several interconnected normalization and transformation functions. The processor applies normalization functions to map raw feature values within each vector to a standardized probability scale ranging from zero to one. The processor normalizes the content vector generated by the semantic analysis module such that each semantic pattern indicator is expressed as a probability value. The processor normalizes the signal artifact vector generated by the acoustic feature module such that each synthetic voice artifact indicator is expressed as a probability value. The processor normalizes the behavior vector generated by the contextual metadata module such that each behavioral deviation metric is expressed as a probability value. The processor associates uncertainty quantification metrics with each normalized vector to characterize the confidence or reliability of the underlying measurements.

In operation at process step 408, the processor applies sigmoid normalization to acoustic anomaly indicators within the signal artifact vector using the mathematical function $\sigma(x)=1/(1+e^{(-x)})$, wherein x represents the raw anomaly indicator value and $\sigma(x)$ represents the normalized probability output. The sigmoid function maps unbounded anomaly scores to the constrained range between zero and one, wherein values approaching one indicate higher anomaly likelihood and values approaching zero indicate lower anomaly likelihood. The processor applies the sigmoid normalization to frequency discontinuity scores, pitch modulation inconsistency scores, compression artifact detection scores, and background noise floor anomaly scores within the signal artifact vector. The processor normalizes semantic pattern confidence scores within the content vector by applying softmax normalization when multiple competing pattern hypotheses require relative probability assignment, or by applying sigmoid normalization to independent pattern indicators. The processor maps identified semantic patterns to a threat taxonomy with associated confidence scores, wherein each taxonomy category receives a normalized probability value indicating the likelihood that the communication exhibits characteristics of that threat category. The processor normalizes behavioral deviation metrics within the behavior vector by computing z-scores relative to historical baseline distributions and applying cumulative distribution function transformations to convert z-scores to probability values, or by applying min-max normalization based on observed or predetermined deviation ranges. The processor computes uncertainty quantification metrics for each normalized vector by calculating variance estimates based on model ensemble disagreement, computing entropy measures based on probability distribution characteristics, or deriving calibrated confidence intervals based on historical prediction accuracy. The processor packages the normalized vectors along with associated uncertainty metrics into fixed-size tensor data structures with consistent dimensional representation, enabling efficient memory access patterns and compatibility with downstream neural network inference operations within the hybrid inference engine.

Alternative implementations of process step 408 may apply tanh normalization to map values to a range between negative one and positive one, with subsequent linear transformation to the zero-to-one probability scale. The processor may alternatively apply percentile-based normalization wherein raw values are mapped to their percentile rank within a reference distribution derived from historical data. The processor may alternatively apply isotonic regression calibration to transform classifier outputs into well-calibrated probability estimates. The uncertainty quantification may alternatively employ Monte Carlo dropout sampling, Bayesian posterior estimation, conformal prediction interval computation, or ensemble disagreement quantification across multiple model variants. The tensor packaging may alternatively employ sparse tensor representations for vectors with predominantly zero values, hierarchical tensor structures preserving feature groupings, or variable-length sequence representations with padding for downstream transformer-based processing.

At a high level, process step 410 comprises a hybrid inference engine execution and composite score synthesis operation wherein the processor synthesizes a composite anomaly score by processing the normalized content vector, signal artifact vector, and behavior vector through a hybrid inference engine comprising a machine learning model and a deterministic rules engine. Process step 410 represents the decision synthesis stage wherein the processor combines probabilistic risk assessment from the machine learning model with expert-defined logical evaluation from the deterministic rules engine to generate a unified anomaly determination.

At process step 410, the processor performs several interconnected inference and synthesis functions. The processor executes a machine learning model trained on historical call datasets to output a probabilistic risk score based on the normalized input vectors. The processor executes a deterministic rules engine configured to apply expert-defined logic to the vectors to output a deterministic risk score, wherein the deterministic rules engine compensates for training data imbalance in the machine learning model by providing detection capability for threat patterns underrepresented in historical training data. The processor applies hierarchical gating logic to the synthesizing of the composite anomaly score, wherein the hierarchical gating logic is configured to override a low-risk score from the machine learning model with a high-risk score from the deterministic rules engine when the signal artifact vector exceeds a pre-defined confidence threshold. The processor generates an interpretability map associated with the composite anomaly score using a white-box machine learning model, wherein the interpretability map identifies which specific feature within the content vector, signal artifact vector, or behavior vector contributed the highest weight to the composite anomaly score. The processor computes the composite anomaly score by aggregating outputs from the machine learning model and the deterministic rules engine according to configured weighting parameters.

In operation at process step 410, the processor loads the trained machine learning model from persistent storage and instantiates an inference session with the normalized content vector, signal artifact vector, and behavior vector as input features. The machine learning model comprises an ensemble architecture including gradient boosting decision tree models and neural network models, wherein each constituent model independently processes the input vectors and generates a probabilistic risk estimate. The processor aggregates predictions from the ensemble members through weighted averaging or stacking to produce the probabilistic risk score output by the machine learning model. The processor executes the white-box machine learning model architecture that exposes internal decision logic and feature contributions, enabling generation of the interpretability map. The processor computes Shapley value decompositions, extracts decision tree feature importance scores, or derives attention weight attributions to identify which specific feature contributed the highest weight to the composite anomaly score, producing the interpretability map as a structured data artifact mapping feature identifiers to contribution magnitudes. Concurrently, the processor executes the deterministic rules engine by evaluating the normalized vectors against a rule set comprising expert-defined conditional logic organized into threat categories. The processor traverses rule chain structures represented as directed acyclic graphs, evaluating conditional predicates against vector feature values and accumulating rule activation signals. The rules encode detection logic for threat patterns including synthetic voice artifacts, social engineering tactics, and behavioral anomalies, wherein the rules are defined based on expert domain knowledge rather than statistical learning from imbalanced training data. The deterministic rules engine compensates for training data imbalance by ensuring that rare but significant threat indicators receive appropriate detection weight regardless of their statistical prevalence in historical datasets. The processor implements hierarchical gating logic by evaluating whether the signal artifact vector exceeds the pre-defined confidence threshold, which may be set to 0.8 or another configured value. When the threshold is exceeded, the hierarchical gating logic overrides a low-risk score from the machine learning model with a high-risk score from the deterministic rules engine, ensuring that high-confidence synthetic voice detections result in elevated risk classification even when the machine learning model produces low-risk output due to limited training exposure to similar patterns. The processor computes the composite anomaly score by applying weighted aggregation to the probabilistic risk score from the machine learning model and the deterministic risk score from the rules engine, wherein the weighting parameters may be statically configured or dynamically adjusted based on module uncertainty levels.

Alternative implementations of process step 410 may employ different machine learning model architectures including random forest classifiers, support vector machines, deep neural networks with fully connected layers, recurrent neural networks for temporal sequence processing, or transformer architectures with self-attention mechanisms. The interpretability map generation may alternatively utilize Local Interpretable Model-agnostic Explanations (LIME), Integrated Gradients, counterfactual explanation methods, or prototype-based explanation approaches. The deterministic rules engine may alternatively be implemented using Rete algorithm optimizations, Drools business rules management system, or compiled rule representations that eliminate interpretation overhead. The hierarchical gating logic may alternatively employ fuzzy logic operators for gradual gating transitions, learned gating functions implemented as auxiliary neural networks, or multi-threshold gating with graduated override behaviors. The composite score aggregation may alternatively utilize Bayesian model combination, Dempster-Shafer evidence fusion, or rank-based aggregation methods.

At a high level, process step 412 comprises a drift detection and adaptive configuration update operation wherein the processor monitors statistical divergence between current audio signal stream characteristics and historical baseline distributions, detects concept drift conditions, and dynamically updates the configuration of the hybrid inference engine based on a feedback loop. Process step 412 enables the anomaly detection system to maintain effectiveness over time by adapting to evolving threat landscapes without requiring complete model retraining.

At process step 412, the processor performs several interconnected monitoring, detection, and adaptation functions. The processor executes a drift detection algorithm configured to monitor a statistical divergence between the real-time audio signal stream and the historical call datasets. The processor automatically triggers the feedback loop when the statistical divergence exceeds a drift threshold. The processor dynamically updates the configuration of the hybrid inference engine based on the feedback loop, wherein a detected anomaly signature is utilized to modify a weighting parameter of the deterministic rules engine to adapt to concept drift. The processor implements an incremental learning process wherein the detected anomaly signature is isolated and injected into the deterministic rules engine as a new rule without retraining the machine learning model on the historical call datasets, thereby enabling real-time adaptation to concept drift.

In operation at process step 412, the processor maintains sliding window buffers containing feature distributions derived from recent audio signal streams processed by the system. The processor periodically computes statistical divergence metrics by comparing the current feature distributions against stored historical baseline distributions derived from the historical call datasets used to train the machine learning model. The processor computes Kullback-Leibler divergence as the primary divergence metric, measuring the relative entropy between the current distribution P and the historical baseline distribution Q according to the formula $D\_KL$ $(P\|Q)=\Sigma P(x)$ $\log(P(x)/Q(x))$ integrated across the feature space. The processor monitors multiple drift indicators including anomaly rate changes tracking the frequency of threshold exceedances relative to historical rates, feature distribution shifts measured through changes in statistical moments including mean, variance, skewness, and kurtosis, and model prediction confidence degradation measured through increasing uncertainty in probabilistic risk scores. The processor compares computed divergence values against the configured drift threshold, which may be calibrated based on acceptable tolerance levels for distribution changes or set through empirical analysis of expected variability. When the statistical divergence exceeds the drift threshold, the processor automatically triggers the feedback loop to initiate adaptive configuration updates. The processor receives feedback signals comprising analyst disposition determinations indicating whether previously flagged communications were confirmed threats or false positives, along with detected anomaly signatures representing feature patterns associated with confirmed novel threats. The processor applies exponential time-decay weighting to feedback signals using the formula $w(t)=e^{\hat{}}(-\lambda\Delta t)$, wherein $\lambda$ represents the decay constant and $\Delta t$ represents the elapsed time since feedback receipt, such that recent feedback signals receive greater influence on configuration updates than older signals. The processor implements the incremental learning process by isolating the detected anomaly signature, extracting distinguishing feature characteristics from the signature, formulating the characteristics as conditional rule predicates in the deterministic rules engine syntax, validating the candidate rule against false positive criteria using holdout data, and injecting the validated rule into the active rule set of the deterministic rules engine. The rule injection occurs without retraining the machine learning model on the historical call datasets, enabling real-time adaptation to concept drift with minimal computational overhead and no operational interruption. The processor modifies weighting parameters of the deterministic rules engine based on aggregated feedback signals, adjusting rule category weights, individual rule confidence thresholds, or hierarchical gating threshold values to optimize detection performance in response to observed true positive and false positive rates.

Alternative implementations of process step 412 may employ different divergence metrics including Jensen-Shannon divergence, Wasserstein distance, Hellinger distance, or Maximum Mean Discrepancy for statistical drift quantification. The drift detection may alternatively utilize sequential analysis methods including Page-Hinkley test, ADWIN adaptive windowing, Drift Detection Method (DDM), or Early Drift Detection Method (EDDM). The time-decay weighting may alternatively apply linear decay, polynomial decay, step-function decay with discrete weight levels, or sliding window approaches that completely discard feedback signals beyond a temporal horizon. The incremental learning may alternatively employ elastic weight consolidation to prevent catastrophic forgetting, progressive neural network architectures that add capacity for new patterns, or experience replay mechanisms that selectively retrain on representative historical examples alongside new patterns. The rule injection may alternatively utilize natural language processing to translate textual threat descriptions into executable rules, graphical rule authoring interfaces, or automated rule synthesis through genetic programming or neural rule learning.

At a high level, process step 414 comprises a security protocol execution and response orchestration operation wherein the processor executes a security protocol when the composite anomaly score exceeds a configured threshold, generating alert packages, initiating response actions, and capturing feedback to support continuous system adaptation. Process step 414 represents the output and action stage wherein the processor transitions detected anomalies into operational security responses and documentation.

At process step 414, the processor performs several interconnected execution, notification, and feedback capture functions. The processor compares the composite anomaly score against the configured threshold and determines whether execution of the security protocol is warranted. The processor generates a detailed alert package comprising the composite anomaly score, contributing feature factors, the interpretability map identifying highest-weight features, and associated audio sample data. The processor transmits alert notifications to security operations infrastructure through secure communication channels. The processor initiates automated response actions based on anomaly severity and configured response policies. The processor logs comprehensive audit records including the full decision path and interpretability map. The processor captures analyst disposition feedback to support the feedback loop enabling dynamic configuration updates in process step 412.

In operation at process step 414, the processor evaluates the composite anomaly score computed in process step 410 against the configured threshold value. The threshold may be set to a fixed value determined through receiver operating characteristic analysis balancing detection sensitivity against false positive rates, or may be dynamically adjusted based on operational context including time-of-day risk factors, account risk tier, or current threat level indicators. When the composite anomaly score exceeds the threshold, the processor constructs the alert package by assembling the composite anomaly score as a quantified severity indicator, the individual vector contributions from the content vector, signal artifact vector, and behavior vector, the interpretability map generated by the white-box machine learning model identifying which specific feature contributed the highest weight to the score, and an audio sample extracted from the communication session enabling human analyst review. The processor encodes the alert package according to standardized security event formats including Common Event Format or JSON-structured alert schemas compatible with Security Information and Event Management platform ingestion requirements. The processor transmits the formatted alert through encrypted network connections to configured security operations endpoints including SIEM platforms for centralized logging and correlation, Security Orchestration, Automation and Response platforms for automated playbook execution, and analyst workstation notification systems for real-time alerting. The processor initiates automated response actions selected from a tiered response matrix mapping composite score ranges to corresponding security actions. For moderate-risk scores, the processor may initiate passive enhanced logging or real-time session flagging for analyst monitoring. For high-risk scores, the processor may initiate step-up authentication challenges transmitted to the communication session participant, requiring real-time spoken responses to dynamically generated verification questions. For severe-risk scores, the processor may initiate session termination by transmitting disconnect commands to telephony infrastructure or communication platform APIs. The processor writes comprehensive audit records to persistent storage capturing the complete decision path including all intermediate processing results, the hierarchical gating evaluation outcome, the interpretability map feature attributions, and the selected response action along with execution confirmation. The processor exposes feedback capture interfaces through which analyst disposition determinations are received, wherein analysts classify alerts as confirmed threats, false positives, or indeterminate requiring further investigation. The processor routes captured disposition feedback to the incremental learning adaptation engine to support the feedback loop described in process step 412, enabling detected anomaly signatures from confirmed threats to be injected as new rules and enabling weighting parameter adjustments based on observed false positive patterns.

Alternative implementations of process step 414 may transmit alerts through syslog protocols, webhook HTTP POST requests, message queue publications, or email notifications with MIME-encoded attachments. The response actions may alternatively include account privilege restrictions, multi-factor authentication elevation requirements, call recording activation for forensic evidence preservation, or routing to specialized fraud handling queues staffed by trained analysts. The audit logging may alternatively utilize append-only blockchain-based ledgers for immutable record-keeping, distributed ledger replication across multiple storage nodes, or hierarchical logging architectures maintaining summary records locally while transmitting detailed records to centralized repositories. The feedback capture may alternatively utilize chatbot interfaces within collaboration platforms, mobile analyst applications, structured survey instruments within case management systems, or automated feedback inference based on downstream transaction outcomes. The processor may alternatively implement graduated response escalation wherein initial threshold exceedances trigger less intrusive responses while sustained or repeated exceedances invoke progressively more aggressive countermeasures.

At a high level, process step 416 comprises a session termination and resource deallocation operation wherein the processor concludes processing of the communication session, releases allocated computational resources, persists session analytics for historical baseline maintenance, and returns to a monitoring state awaiting subsequent communication sessions. Process step 416 ensures proper resource lifecycle management and supports accumulation of historical data that informs drift detection and model refinement.

At process step 416, the processor performs several interconnected termination, persistence, and cleanup functions. The processor detects session termination conditions including natural call completion, anomaly-triggered termination, or timeout expiration. The processor flushes any remaining audio frames through the processing pipeline to ensure complete analysis of the communication session. The processor persists session feature vectors and analysis results to historical databases supporting drift detection baseline maintenance and model retraining data accumulation. The processor deallocates memory buffers, terminates parallel execution contexts, and releases computational resources associated with the concluded session. The processor updates session state to terminated and archives session records according to configured retention policies. The processor returns to an idle monitoring state prepared to process subsequent incoming communication sessions.

In operation at process step 416, the processor monitors for session termination signals including network connection closure events, telephony signaling messages indicating call completion such as SIP BYE messages or RTP stream termination, explicit termination commands issued by process step 414 in response to severe anomaly detection, or session timeout expiration when no audio frames are received within a configured idle threshold duration. Upon detecting a termination condition, the processor drains any audio frames remaining in input buffers through the complete processing pipeline, ensuring that the final segments of the communication session receive full multi-modal analysis and contribute to the composite anomaly score. The processor aggregates session-level analytics including total session duration, cumulative anomaly score trajectory over the session, count and severity of individual anomaly detections, and final disposition if available. The processor persists the normalized content vector, signal artifact vector, and behavior vector to a historical feature database that maintains the baseline distributions referenced by the drift detection algorithm in process step 412. The feature persistence employs time-stamped record insertion enabling temporal queries and distribution computation across configurable historical windows. The processor applies data retention policies that may include anonymization transformations removing personally identifiable information while preserving statistical utility, aggregation operations that compress individual session records into summary statistics, or archival transfers that migrate aged records to cold storage tiers. The processor deallocates the circular audio buffers allocated during process step 402 by releasing memory back to the system memory allocator or memory pool manager. The processor terminates the parallel execution threads or coroutines instantiated during process step 404, joining thread handles, canceling pending asynchronous tasks, and releasing thread-local storage. The processor releases any GPU memory allocations associated with neural network inference operations and unloads model weights that are not retained for subsequent sessions. The processor updates the session state machine to the terminated state and writes a final session record to the audit log capturing session lifecycle time-stamps and resource utilization metrics. The processor returns to an idle monitoring state wherein it awaits incoming communication session signals at process step 402, ready to reinitiate the processing cycle for subsequent sessions.

Alternative implementations of process step 416 may implement graceful degradation procedures that continue partial processing when resource pressure requires early session termination. The feature persistence may alternatively utilize streaming inserts to real-time analytics databases, batch uploads to data lake storage at configurable intervals, or event-driven persistence triggered by specific anomaly detection events rather than session completion. The anonymization may alternatively employ differential privacy mechanisms, k-anonymity transformations, synthetic data generation, or secure multi-party computation protocols enabling collaborative analytics without raw data sharing. The resource deallocation may alternatively employ garbage collection in managed runtime environments, reference counting with deterministic destruction, or arena allocation with bulk deallocation at session boundaries. The processor may alternatively maintain warm model instances and pre-allocated buffer pools across sessions to minimize initialization latency for subsequent communications, implementing resource pooling rather than full deallocation and reallocation cycles.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments). Any of the above mentioned systems, units, modules, engines, controllers, components, process steps or the like may be and/or comprise hardware and/or software as described herein. For example, the systems, engines, and subcomponents described herein may be and/or comprise computing hardware and/or software as described herein in association with FIGS. 4-7. Furthermore, any of the above mentioned systems, units, modules, engines, controllers, components, interfaces or the like may use and/or comprise an application programming interface (API) for communicating with other systems units, modules, engines, controllers, components, interfaces or the like for obtaining and/or providing data or information.

Figure 4:
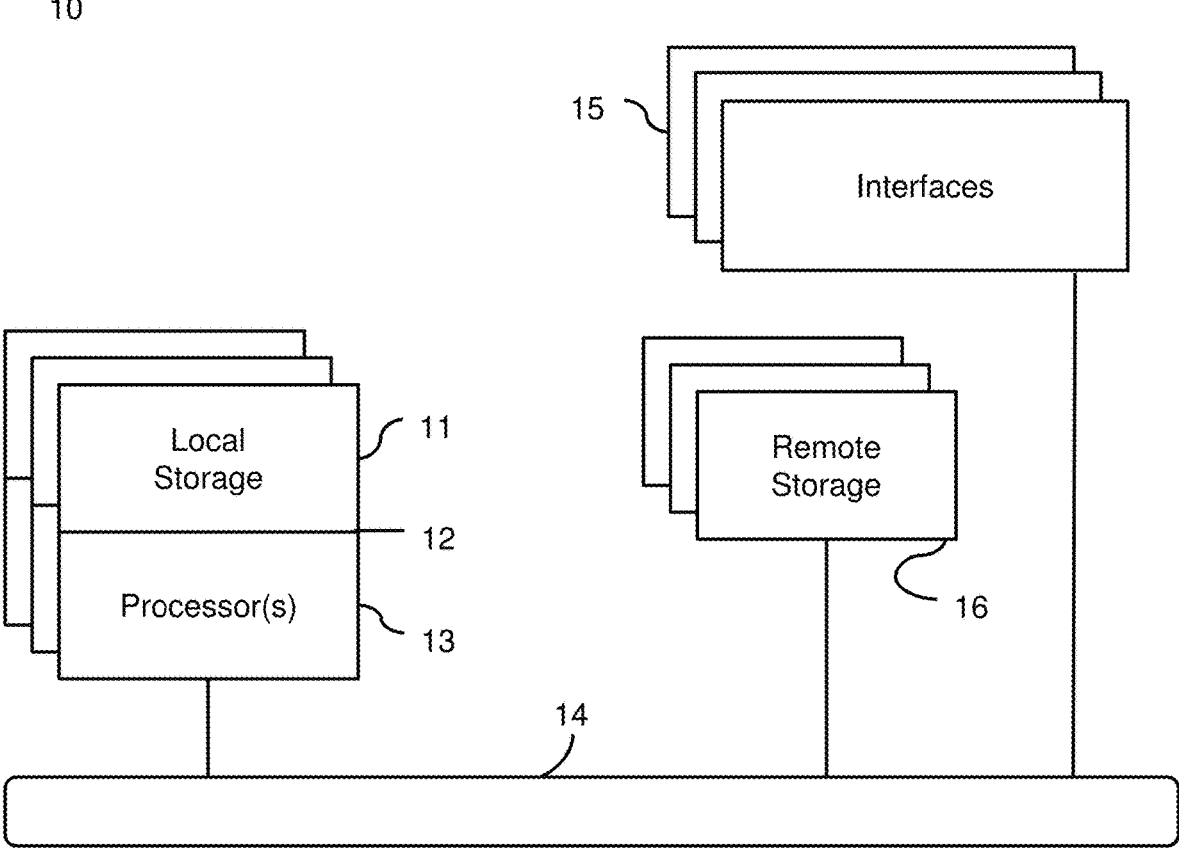
FIG. 4 illustrates one embodiment of the computing architecture that supports an embodiment of the inventive disclosure.

Referring now to FIG. 4, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random-access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAP-DRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FD-DIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 4 illustrates one specific architecture for a computing device 10 for implementing one or more of the embodiments described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, single processor 13 handles communications as well as routing computations, while in other embodiments a separate dedicated communications processor may be provided. In various embodiments, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 5:
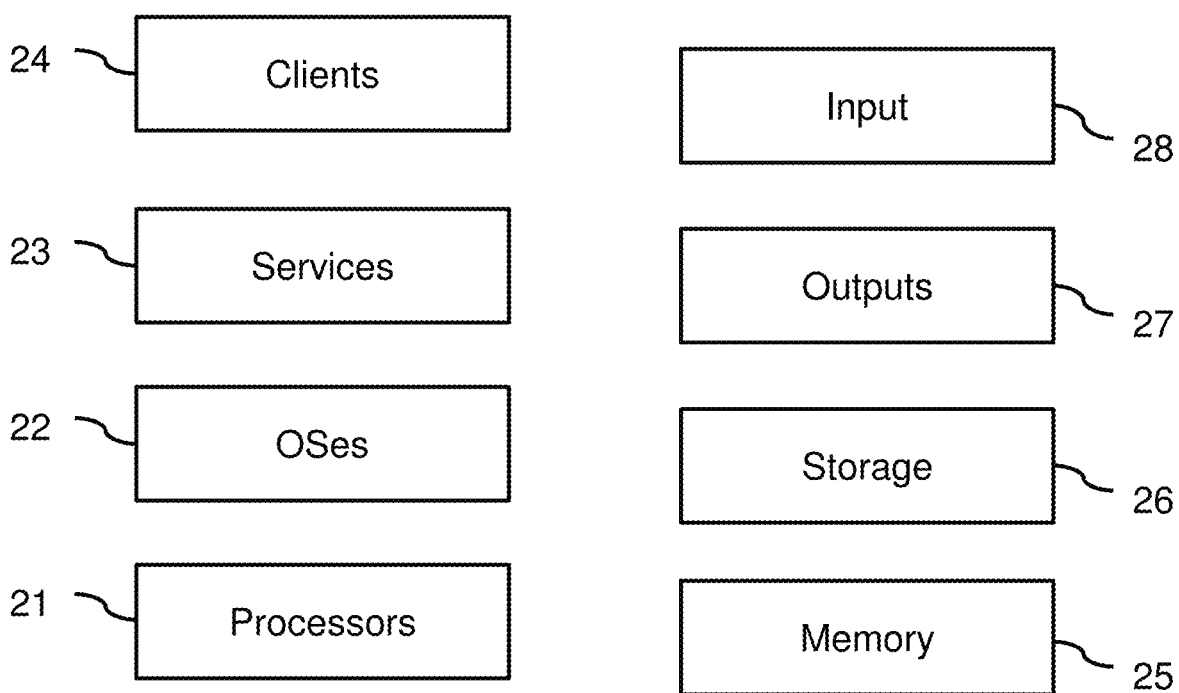
FIG. 5 illustrates components of a system architecture that supports an embodiment of the inventive disclosure.

In some embodiments, systems may be implemented on a standalone computing system. Referring now to FIG. 5, there is shown a block diagram depicting a typical exemplary architecture of one or more embodiments or components thereof on a standalone computing system. Computing device 20 includes processors 21 that may run software that carry out one or more functions or applications of embodiments, such as for example a client application. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 4). Examples of storage devices 26 include flash memory, magnetic hard drive, CD-ROM, and/or the like.

Figure 6:
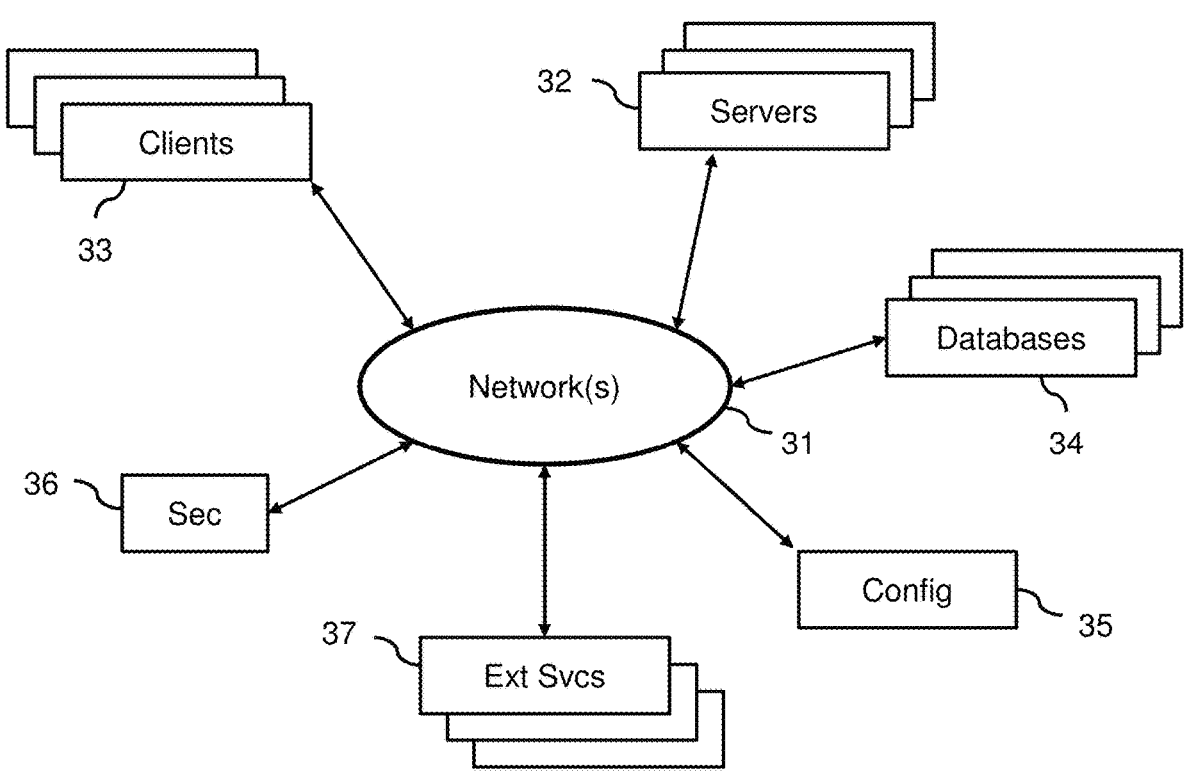
FIG. 6 illustrates components of a computing device that supports an embodiment of the inventive disclosure.

In some embodiments, systems may be implemented on a distributed computing network, such as one having any number of clients and/or servers. Referring now to FIG. 6, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 5. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in one aspect where client applications are implemented on a smartphone or other electronic device, client applications may obtain information stored in a server system 32 in the cloud or on an external service 37 deployed on one or more of a particular enterprise's or user's premises.

In some embodiments, clients 33 or servers 32 (or both) may make use of one or more specialized services or appliances that may be deployed locally or remotely across one or more networks 31. For example, one or more databases 34 may be used or referred to by one or more embodiments. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some embodiments may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments without limitation, unless a specific security 36 or configuration system 35 or approach is specifically required by the description of any specific aspect.

Figure 7:
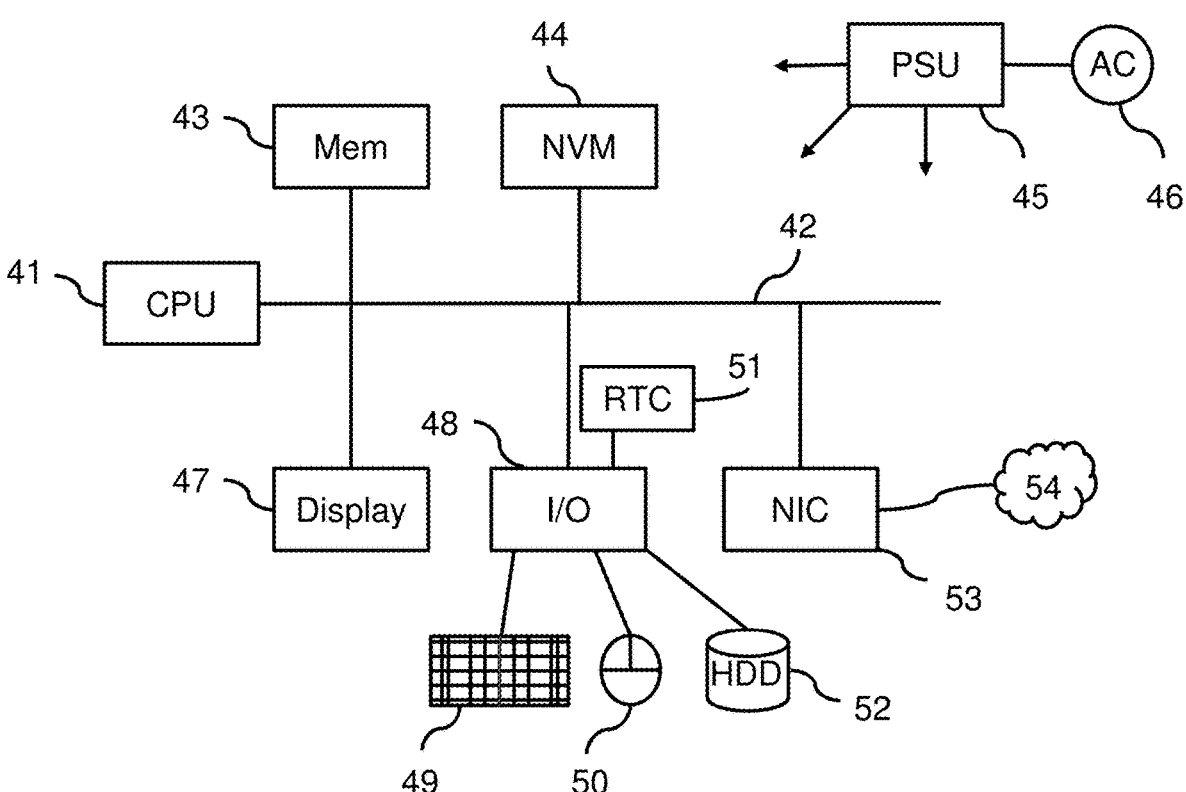
FIG. 7 illustrates components of a computing device that supports an embodiment of the inventive disclosure.

FIG. 7 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of various embodiments may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various embodiments described above. Accordingly, the present invention is defined by the claims and their equivalents.

Additional Considerations

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or appartus. Further, unless expressly stated to the contrary, "or" refers to an inclusive or and not to an exclusive or. For example, a condition A or B is satisfied by any one of the following: A is true (or present) and Bis false (or not present), A is false (or not present) and Bis true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and/or a process associated with the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

What is claimed is:

1. A system for real-time anomaly detection in audio signal streams, the system comprising:

hardware processor and a memory storing instructions that, when executed, cause the processor to perform operations comprising:

ingesting a real-time audio signal stream associated with a communication session;

simultaneously routing, via a parallel processing architecture, the audio signal stream to a semantic analysis module, an acoustic feature module, and a contextual metadata module;

generating, via the semantic analysis module, a content vector based on converting the audio signal stream into text and identifying semantic patterns;

generating, via the acoustic feature module operating independently of the semantic analysis module, a signal artifact vector by performing spectral analysis on the audio signal stream to identify non-semantic synthetic voice artifacts, including frequency discontinuities and pitch modulation inconsistencies;

generating, via the contextual metadata module, a behavior vector based on transmission metadata associated with the audio signal stream;

synthesizing a composite anomaly score by processing the content vector, the signal artifact vector, and the behavior vector through a hybrid inference engine, wherein the hybrid inference engine comprises:

a machine learning model trained on historical call datasets to output a probabilistic risk score; and a deterministic rules engine configured to apply expert-defined logic to the vectors to output a deterministic risk score, wherein the deterministic rules engine compensates for training data imbalance in the machine learning model; and dynamically updating a configuration of the hybrid inference engine based on a feedback loop, wherein a detected anomaly signature is utilized to modify a weighting parameter of the deterministic rules engine to adapt to concept drift; and executing a security protocol when the composite anomaly score exceeds a threshold.

2. The system of claim 1, wherein the acoustic feature module is configured to generate the signal artifact vector by analyzing a spectral energy distribution of the audio signal stream to detect digital compression artifacts that are indicative of synthetic audio generation, wherein said compression artifacts are undetectable by the semantic analysis module.

3. The system of claim 1, wherein the spectral analysis comprises measuring a consistency of a background noise floor during periods of active speech, and wherein the signal artifact vector flags the audio signal stream as anomalous when the background noise floor exhibits digital silence or frequency discontinuities characteristic of deepfake splicing.

4. The system of claim 1, wherein the hybrid inference engine applies a hierarchical gating logic to the synthesizing of the composite anomaly score, wherein the hierarchical gating logic is configured to override a low-risk score from the machine learning model with a high-risk score from the deterministic rules engine when the signal artifact vector exceeds a pre-defined confidence threshold.

5. The system of claim 1, wherein the machine learning model is a white-box model configured to generate an interpretability map associated with the composite anomaly score, wherein the interpretability map identifies which specific feature within the content vector, signal artifact vector, or behavior vector contributed the highest weight to the composite anomaly score.

6. The system of claim 1, wherein the dynamically updating of the configuration comprises an incremental learning process, wherein the detected anomaly signature is isolated and injected into the deterministic rules engine as a new rule without retraining the machine learning model on the historical call datasets, thereby enabling real-time adaptation to concept drift.

7. The system of claim 1, further comprising a drift detection algorithm configured to monitor a statistical divergence between the real-time audio signal stream and the historical call datasets, and wherein the feedback loop is automatically triggered when the statistical divergence exceeds a drift threshold.

8. The system of claim 1, wherein the semantic analysis module, the acoustic feature module, and the contextual metadata module are configured to normalize the content vector, the signal artifact vector, and the behavior vector, respectively, into a standardized probability scale prior to processing by the hybrid inference engine.

* * * * *